US011875311B2

(12) United States Patent
Fong et al.

(10) Patent No.: US 11,875,311 B2
(45) Date of Patent: Jan. 16, 2024

(54) COMMUNICATION PLATFORM DOCUMENT AS A COMMUNICATION CHANNEL

(71) Applicant: Salesforce, Inc., San Francisco, CA (US)

(72) Inventors: Andrew Fong, Menlo Park, CA (US); Michael Hahn, San Francisco, CA (US); Ed Donghyun Kim, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/566,429

(22) Filed: Dec. 30, 2021

(65) Prior Publication Data
US 2023/0214780 A1 Jul. 6, 2023

(51) Int. Cl.
*G06Q 10/10* (2023.01)
*G06F 16/176* (2019.01)
(Continued)

(52) U.S. Cl.
CPC ......... *G06Q 10/103* (2013.01); *G06F 3/0482* (2013.01); *G06F 16/176* (2019.01);
(Continued)

(58) Field of Classification Search
CPC ............. G06Q 10/109; G06Q 10/1097; G06Q 10/101; G06Q 10/103; G06F 16/176; G06F 3/0482; H04L 65/4015
See application file for complete search history.

(56) References Cited

U.S. PATENT DOCUMENTS 7,634,732 B1 * 12/2009 Blagsvedt ............. G06F 3/0481
707/999.01
9,135,234 B1 * 9/2015 Mattos .................. G06F 40/189
(Continued)

FOREIGN PATENT DOCUMENTS

WO WO2013067239 A1 5/2013
WO WO2021167765 A1 8/2021

OTHER PUBLICATIONS

C. Ross, Spencer M. "Slack it to me: Complementing LMS with student-centric communications for the millennial/post-millennial student." Journal of Marketing Education 41.2 (2019): 91-108. (Year: 2019).*

(Continued)

*Primary Examiner* — Andrew L Tank
(74) *Attorney, Agent, or Firm* — Lee & Hayes, P.C.

(57) ABSTRACT

Techniques for enabling an efficient means of collaborating via a collaborative document associated with a communication platform are described herein. In some examples, the collaborative document can be created within and managed by the communication platform. In at least one example, a collaborative document can support editable text and/or objects that can be ordered, added, deleted, modified and/or the like, such as by members thereof. Additionally, the collaborative document can include messaging functionalities. In at least one example, the collaborative document can include or be associated with a document identifier configured to enable functionalities associated with the type of virtual space corresponding to the virtual space identifier. That is, the collaborative document can leverage existing paradigms associated with the communication platform to enable the functionalities. In at least one example, the functionalities can enable the members to collaborate efficiently and effectively via the collaborative document.

20 Claims, 14 Drawing Sheets

(51) Int. Cl.
  *G06F 3/0482* (2013.01)
  *G06Q 10/101* (2023.01)
  *G06Q 10/109* (2023.01)
  *H04L 65/401* (2022.01)

(52) U.S. Cl.
  CPC ......... *G06Q 10/101* (2013.01); *G06Q 10/109* (2013.01); *H04L 65/4015* (2013.01)

(56) References Cited

U.S. PATENT DOCUMENTS

| | | | | |
|---|---|---|---|---|
| 9,197,718 | B2* | 11/2015 | Kiang | G06Q 10/10 |
| 10,021,059 | B1* | 7/2018 | Rao | H04L 63/0428 |
| 10,108,613 | B2* | 10/2018 | Spataro | G06Q 10/10 |
| 10,353,664 | B2* | 7/2019 | Poel | G06F 3/1454 |
| 10,979,432 | B1 | 4/2021 | Frank et al. | |
| 2003/0167281 | A1* | 9/2003 | Cohen | G06Q 10/10 |
| 2004/0267871 | A1* | 12/2004 | Pratley | G06Q 10/10 709/200 |
| 2006/0101321 | A1* | 5/2006 | Friedrichowitz | G06F 40/174 715/255 |
| 2011/0078615 | A1* | 3/2011 | Bier | G06F 9/451 715/779 |
| 2012/0284596 | A1* | 11/2012 | Bushnell | G06Q 10/06 715/205 |
| 2013/0151624 | A1* | 6/2013 | Bhogal | G06F 3/0484 709/205 |
| 2013/0262574 | A1* | 10/2013 | Cohen | H04L 12/1818 709/204 |
| 2014/0207730 | A1 | 7/2014 | Spataro et al. | |
| 2014/0298207 | A1* | 10/2014 | Ittah | G06Q 10/00 715/753 |
| 2014/0372852 | A1* | 12/2014 | Rothschiller | G06F 40/106 715/212 |
| 2015/0082198 | A1* | 3/2015 | Destagnol | H04L 12/1859 715/753 |
| 2015/0378974 | A1 | 12/2015 | Massand | |
| 2016/0259522 | A1* | 9/2016 | Gonzalez | H04L 65/403 |
| 2017/0364866 | A1* | 12/2017 | Steplyk | G06Q 10/063114 |
| 2018/0248835 | A1* | 8/2018 | Luthra | H04L 51/32 |
| 2018/0287982 | A1 | 10/2018 | Draeger et al. | |
| 2020/0210383 | A1* | 7/2020 | Demaris | G06F 16/168 |
| 2020/0294001 | A1* | 9/2020 | Sexauer | G06Q 10/109 |
| 2020/0302107 | A1* | 9/2020 | Vembu | H04L 51/10 |
| 2020/0403951 | A1* | 12/2020 | Kapoor | H04L 51/216 |
| 2021/0126805 | A1* | 4/2021 | Archer | G06F 3/0481 |
| 2021/0350303 | A1* | 11/2021 | Omar | G06Q 10/06316 |

OTHER PUBLICATIONS

D. C. Walter, I. Riley and R. Gamble, "Configuring an appropriate team environment to satisfy relevant criteria," 2016 IEEE Frontiers in Education Conference (FIE), Erie, PA, USA, 2016, pp. 1-9, doi: 10.1109/FIE.2016.7757707. (Year: 2016).*

Unknown, "Working with Teams and Channels", https://it.tufts.edu/book/export/html/1913 Jul. 25, 2020, as evidenced by Internet Archive https://web.archive.org/web/20200725081537/https://it.tufts.edu/book/export/html/1913, pp. 1-12 (Year: 2020).*

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! a Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>(dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.xt>. (dated May 1993) 57 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

Heather Majors: "How to Use Microsoft Whiteboard in Teams Meetings—For Beginners", Oct. 19, 2021 (Oct. 19, 2021), XP093031942, Retrieved from the Internet: URL:https://www.youtube.com/watch?v=n4s3Ypj7fDg [retrieved on Mar. 15, 2023] the whole document, 1 page.

Leila Gharani: "How to use Microsoft Whiteboard: Essential Practices for Meetings", Feb. 9, 2021 (Feb. 9, 2021), XP093031412, Retrieved from the Internet: URL:https://www.youtube.com/watch?v=LL-OshD9vq0 [retrieved on Mar. 14, 2023] the whole document, 1 page.

Mike Tholfsen: "The New Microsoft Teams Whiteboard 2021 II A fully updated & improved Whiteboard in Teams meetings", Nov. 8, 2021 (Nov. 8, 2021), XP093031406, Retrieved from the Internet: URL:https:||www.youtube.com|watch?v=vDO-EUZUmiA [retrieved on Mar. 14, 2023] the whole document, 1 page.

The PCT Search Report and Written Opinion dated Mar. 28, 2023 for PCT application No. PCT/US2022/053854, 17 pages.

Thomas: "Microsoft Office Live Meeting 2007 – Handouts and Shared Notes | Thomas—Technical Blogger", Oct. 8, 2007 (Oct. 8, 2007), XP055187463, Retrieved from the Internet: URL:https://

(56) References Cited

OTHER PUBLICATIONS scissormonkey.wordpress.com/2007/10/08/microsoft-office-live-meeting-2007-handouts-and-shared-notes/ [retrieved on May 5, 2015] p. 1-p. 2.

* cited by examiner

COMMUNICATION PLATFORM DOCUMENT AS A COMMUNICATION CHANNEL

TECHNICAL FIELD

Communication platforms are becoming increasingly more popular for facilitating work-related communications, such as for project collaboration within a single organization and across two or more organizations. To facilitate project collaboration, users often share information via documents. For example, a first user can solicit feedback on a document by sharing the document via a communication platform. Other users may modify the document and re-share a modified document with the first user. However, receiving modified documents from different users can be unwieldy, cumbersome, and can lead to information in one or more modified documents getting lost. In some instances, users can utilize third-party documents to collaborate on a same document, synchronously or asynchronously. For example, the first user could share a link to a third-party document managed by a third-party service provider, via which other users may provide input.

However, the use of third-party documents may be limited to merely providing input on the document itself. That is, the limited functionality of the third-party document may require users to adopt different means by which they chat, manage tasks, and otherwise collaborate. In some cases, the users are required to switch between use of the third-party document and another interface for performing other functions associated with collaboration. Switching between interfaces can be inefficient and unwieldy for the user, and can require the use of significant computing resources.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
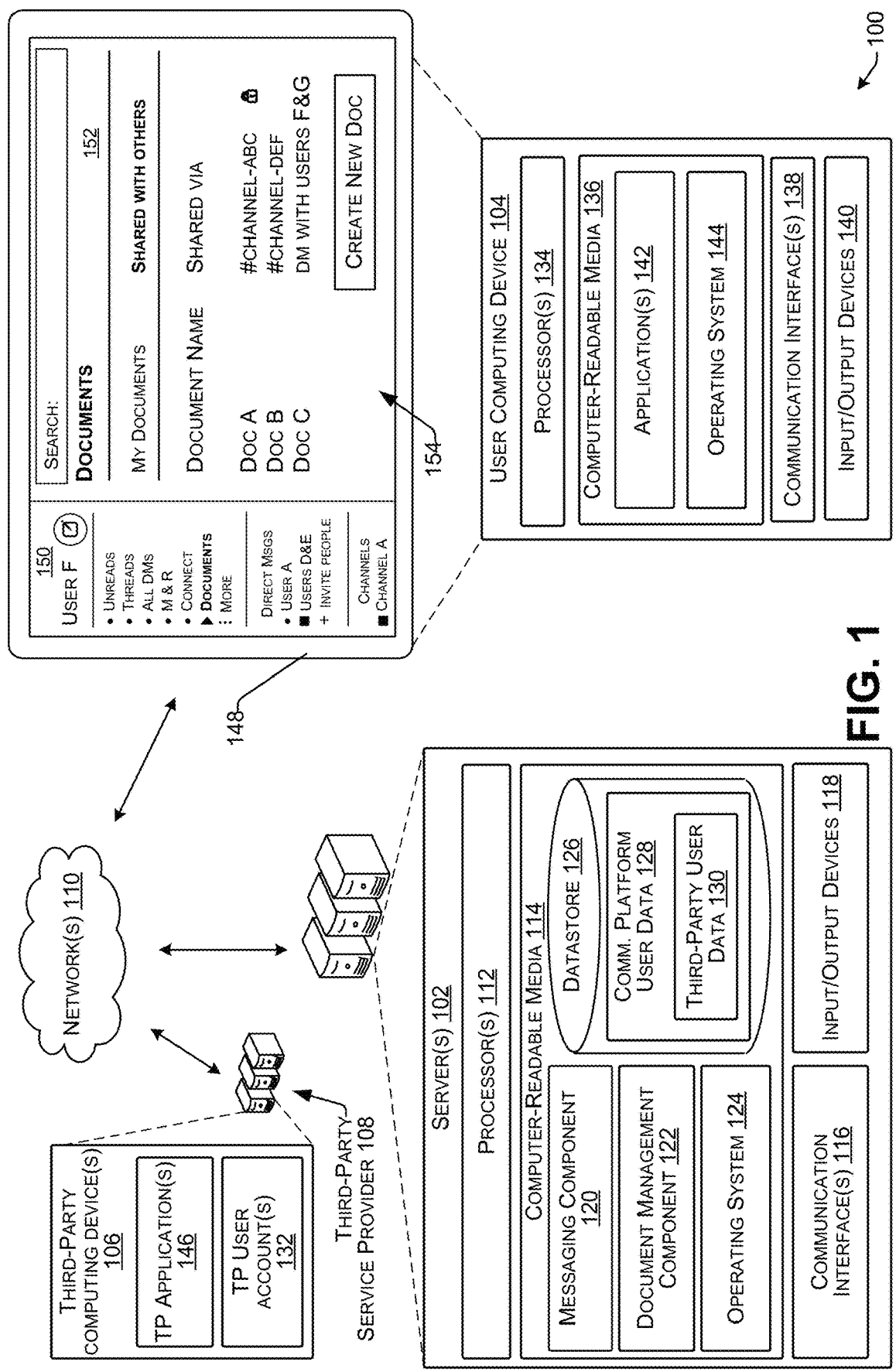
FIG. 1 illustrates an example system for performing techniques described herein.

Techniques for providing collaborative documents within a communication platform are described herein. The communication platform can be a group-based communication platform, a channel-based messaging platform and/or any other platform for facilitating communication between and among users. In an example, a first user can request to create a collaborative document, the request including an indication of a virtual space with which to associate the collaborative document. In response to the request, the communication platform can create the collaborative document and cause display of an affordance (e.g., identifier, indicator, selectable control, user interface element, etc.) associated with the collaborative document in association with the virtual space, the affordance enabling members (e.g., users) of the virtual space to access, modify, communicate, and/or otherwise collaborate via the collaborative document. In at least one example, the collaborative document can be configured to enable a plurality of functionalities available via the communication platform, such as to enhance usability of the collaborative document.

As discussed above, in existing technologies, a first user may share a document with a second user, such as to get feedback on the document. The second user may edit or otherwise modify the document and send the modified document back to the first user. However, sharing modified documents back and forth between users can be an inefficient means by which users collaborate on a document. In some examples, the first user can alternatively share a link to a third-party document managed by a third-party service provider, such as to solicit feedback from the second user. However, the third-party documents that enable modifications, comments, and the like are limited to the static functionality of collaborative word processing. That is, the third-party documents are not configured to provide additional functionalities that may be helpful in collaboration, such as real-time or near real-time communications, managing tasks, tracking progress on a project, accessing scheduling information or tasks associated with collaborators, and/or the like. In addition, third-party applications may be unable to write directly to third-party documents. As such, to effectively collaborate, users may be required to run multiple different programs, each configured to perform a different functionality, in order to access information necessary to effectively collaborate.

Techniques described herein are directed to enabling an efficient means of collaborating via a collaborative document associated with the communication platform. In some examples, the collaborative document can be created within and managed by the communication platform. In at least one example, a collaborative document can support editable text and/or objects that can be ordered, added, deleted, modified and/or the like. An object can include, but is not limited to, text (e.g., which can be editable), a file (e.g., text, audio, video, an application, etc.), a task to be completed, a ticket to be resolved, an event (e.g., scheduled event, calendar invitation, calendar instance, etc.), a message previously transmitted via the communication platform, an image, a graphic, a link to a local object, a link to a remote object (e.g., third-party object), and/or the like. In various examples, each collaborative document can be associated with permissions defining which users of the communication platform can view and/or edit the collaborative document. In various examples, the permissions may be defined based on a means by which the collaborative document was created.

In at least one example, the communication platform can receive a first request from a first user to create a collaborative document. In some examples, the first request may be received via a virtual space (e.g., workspace, communication channel, direct message instance, document, board, audio or video communication, etc.) associated with the communication platform. In some examples, the communication platform can be associated with a first user account of the first user. For example, the first user may select an affordance or indicator associated with creating a new document that is presented in association with the virtual space. Based on the selection of the affordance or the indicator, the communication platform may receive the first request to create the collaborative document. Alternatively, the request may be received independent of a virtual space. That is, the first user can submit a first request to create the collaborative document independent of a virtual space (e.g., in association with a user account of the first user), such that the collaborative document can be available for use by the first user.

In response to receiving the first request, the communication platform can identify one or more users to be associated with the collaborative document. In examples in which the collaborative document is created independent of a virtual space, the communication platform can identify the requesting user (e.g., the first user) as a user to be associated with the collaborative document. In such examples, the communication platform can associate an identifier associated with the requesting user with the collaborative document. The identifier can include a real name, username, combination of one or more numbers, letters, symbols, and/or the like. In examples in which the first request is submitted via a virtual space, the communication platform can identify one or more members of the virtual space as user(s) to be associated with the collaborative document. That is, user identifier(s) that are associated with the virtual space may additionally be associated with the collaborative document such that any of the members of the virtual space can access and/or collaborate via the collaborative document. In some examples, the collaborative document can be implemented as a hidden virtual space or as a hidden channel.

Additionally, the communication platform can associate a document identifier with the collaborative document. The document identifier can be stored as metadata and can include a unique code (e.g., numbers, letters, symbols, and/or a combination thereof) that can be used to identify the collaborative document. In various examples, the document identifier can include a same or similar identifier that is associated with a type of virtual space of the communication platform. In such examples, the document identifier can enable one or more functionalities with respect to the collaborative document that are associated with the type of virtual space. Non-limiting examples of the functionalities can include messaging functionalities (e.g., chat channel), message timing documentation (e.g., time stamps), audio and/or video communications, file uploads, notifications (e.g., associated with modifications to the collaborative document, new messages posted, mentions or tags, etc.), mentioning or tagging functionalities, event conveyance, workflow management and tracking, access permissions, and/or other functionalities that are enabled based on the type of virtual space. For example, the document identifier can include a communication channel identifier that provides the collaborative document with functionalities that are associated with communication channels. That is, the communication platform can treat the collaborative document as a communication channel such that functionalities of the communication channel may be imbued in the collaborative document. By treating the collaborative document as a type of existing virtual space, the communication platform can reduce the overhead with respect to collaborative documents, such as by leveraging existing paradigms within the communication platform.

In various examples, the communication platform can identify one or more objects to be associated with the collaborative document. In some examples, the communication platform can identify the object(s) based on user input from the creating user (e.g., the first user). In such examples, the first user, such as in association with the first request to create the collaborative document, can input one or more objects to be associated with the collaborative document. Based on the user input, the communication platform can cause the object(s) to be presented in association with the collaborative document. In at least one example, an object may include a word processing template configured to enable users to enter data into the collaborative document, such as to receive feedback thereon Additionally or alternatively, the communication platform can identify the object(s) based on membership associated with the collaborative document. That is, the communication platform can identify the object(s) based on the user(s) associated as members of the collaborative document. In various examples, the communication platform can cause display of the identified object(s) in association with the collaborative document. For example, the communication platform can determine that a second user is a member of a virtual space (e.g., a channel, a synchronous or asynchronous meeting, etc.) via which the collaborative document was created, and is thus also a member of the collaborative document. The communication platform can identify a task that is assigned to the second user in association with the virtual space and can cause display of the task in association with the collaborative document.

In various examples, the communication platform can cause an affordance or identifier associated with the collaborative document to be presented via a user interface associated with each member of the collaborative document. That is, the communication platform can modify user interface(s) corresponding to the one or more users associated with the collaborative document to include the affordance. In various examples, the affordance may include a user interface element that, when selected by a respective user, causes the collaborative document to be presented via a user interface associated with the user.

In some examples, the affordance can be presented in association with a virtual space corresponding to the collaborative document. For example, one or more affordances corresponding to one or more documents that are associated with virtual space can be presented in a header associated with the virtual space. Though this is merely an illustrative example, and the one or more affordances may be presented in other locations within or in association with the virtual space.

Additionally or alternatively, the affordance or identifier can be presented in a sidebar of a user interface. In some examples, the sidebar can include a portion of the user interface that includes lists of virtual spaces that are associated with a particular user account. For example, the sidebar may include a list of documents, workspaces, communication channels, direct messaging instances, and/or the like that are associated with a user account of a viewing user. In various examples, an affordance associated with a collaborative document can be presented in association with the virtual space via which the collaborative document was created. In some examples, the affordance associated with the collaborative document can be presented in association with other collaborative documents associated with a particular user account.

In some examples, the sidebar of the user interface can additionally include one or more affordances or identifiers associated with one or more objects that are associated with a collaborative document. In some examples, the affordance(s) or identifier(s) may be presented in the sidebar based on a determination that the object(s) associated therewith are assigned to or otherwise associated with a respective user account. For example, a first user interface corresponding to a first user associated with a collaborative document may include a first affordance or identifier of a first object that is associated with the collaborative document and assigned to or otherwise associated with the first user and a second user interface corresponding to a second user associated with the collaborative document may include a second affordance or identifier of a second object that is associated with the collaborative document and assigned to or otherwise associated with the second user.

In some examples, in response to receiving an indication of selection of the affordance or identifier associated with an object, the communication platform can cause display of the object within a respective collaborative document. In some examples, in response to receiving an indication of selection of the affordance or identifier associated with an object, the communication platform can cause display of the object directly. That is, the communication platform can cause the object to be rendered via a respective user interface independent of the collaborative document associated therewith. For example, an object may include a task that is associated with a collaborative document and assigned to a user. In response to receiving an indication of selection of an affordance or identifier associated with the object, the communication platform may render details associated with the task directly (e.g., independent of the collaborative document) via the user interface.

In some examples, the object(s) associated with a collaborative document can include third-party objects that are managed by or otherwise stored in association with a third-party service provider. In such examples, the user associated with a third-party user account may provide credentials, tokens, or other information necessary for the communication platform to access data associated with the object(s). That is, the user(s) associated with a collaborative document may provide the communication platform information necessary to access third-party user account(s) associated with objects included in a collaborative document. In response to receiving a request to access the object (e.g., receiving a selection of an affordance associated with the object), the communication platform can send a request to the third-party service provider to receive the requested data associated with the object. For example, an object may include a meeting invitation associated with a third-party scheduling service. In response to receiving a request to view the object, such as a selection of an affordance associated with the object in a sidebar, the communication platform may request data from the third-party scheduling service. The communication platform may then cause the data associated with the object to be presented to the requesting user via the user interface.

Additionally or alternatively, the communication platform can configure the collaborative document and/or one or more objects associated therewith to be shared with one or more additional users after a creation thereof. In some examples, the collaborative document can be shared by an administrator or owner (e.g., the first user) of the collaborative document. That is, the user associated with a creation of the collaborative document may include permissions to share the collaborative document with additional users. In some examples, the collaborative document can be configured to be shared by one or more members of the collaborative document, such as based on permissions setting associated therewith. For example, a first user and a second user may be members of a collaborative document. The first user may include sharing permissions while the second user may not include sharing permissions. For another example, a collaborative document may be configured such that all members of the collaborative document can share with additional users of the communication platform.

In various examples, the communication platform can receive a second request to share the collaborative document with one or more additional users of the communication platform. In examples in which the collaborative document is generated in association with a virtual space (e.g., a first virtual space), the second request can represent a request to share the collaborative document with additional user(s) who are not associated with the virtual space (e.g., a channel, a synchronous meeting, a current document). In examples in which the collaborative document is generated independent of a virtual space (e.g., generated in association with the user account of the first user), the second request can represent a preliminary request to share the collaborative document with one or more other users of the communication platform.

In various examples, the second request can include one or more user identifiers associated with the additional user(s). In such examples, the collaborative document can be shared with the additional user(s) directly, such as via a direct messaging instance or via a mention to a reference of an additional user's account. In some examples, the second request can include one or more virtual space identifiers associated with the communication platform. In such examples, the collaborative document can be shared via the identified virtual space(s). In at least one example, in response to receiving the second request, the communication platform can update membership of the collaborative document based on the additional user(s). That is, the communication platform can associate the additional user(s) as members of the collaborative document, such that the additional user(s) have access to and/or editing permissions associated with the collaborative document.

In some examples, the second request can include a permission setting associated with editing functionality of the collaborative document. That is, the user requesting that the collaborative document be shared with the additional user(s) (e.g., first user, second user, etc.) can establish permission settings associated with the additional user(s). The permission settings can include a read or view-only setting, chat-only setting (e.g., enabling messaging but not modification of other text in the document), full editing permissions, and/or the like. In various examples, the communication platform may store the permission settings associated with the additional user(s) in association with the collaborative document. The permission setting associated with the additional user(s) may be the same or different from the permission setting associated with other members of the collaborative document. For example, the first user may create the collaborative document in association with a first virtual space. The members of the first virtual space may be associated with the collaborative document as members thereof, with a first permission setting including full editing permissions. The first user may then share the collaborative document via a second virtual space, and may designate a second permission setting including read-only permissions with the members of the second virtual space. That is, the members of the second virtual space may be authorized to view the collaborative document, while members of the first virtual space edit and contribute to the collaborative document. In some examples, permission settings can be on a section by section basis where a first user may modify a first section of a collaborative document, but not a second section of the collaborative document. In some examples, a first user may view a first section of a collaborative document but not a second section of the collaborative document.

From the user experience perspective, techniques described herein greatly enhance the utility and functionality of a collaborative document within the communication platform. As discussed above, conventional techniques include the user of third-party documents to enable real-time collaboration on a document. However, these third-party documents are limited in functionality to word processing and related functions. Unlike the third-party documents, the collaborative documents described herein enable additional functionalities that are provided by the communication platform. That is, in lieu of being limited to mere word processing and related functionalities, the techniques described herein enable real-time or near real-time messaging functionalities (e.g., text, audio, video, etc.), message tracking functionalities (e.g., time stamps, organization, etc.), mentioning or tagging functionalities, notification functionalities, sharing functionalities (e.g., via virtual spaces, individually, in groups, etc.), and other functions powered by the communication platform. In some examples, a collaborative document may share any portion of the document and associated message functionalities to the communication platform and vice versa. For example, a user who is mentioned may receive a notification of the comment in the communication platform. In some examples, comments posted in the communication platform on a message associated with the collaborative document may be output to the collaborative document. Similarly, messages received from a third party application or a workflow in the communication platform may also be output to the collaborative document, thereby reducing the need for a user to cut and paste comments between the communication platform and the collaborative document. Accordingly, the techniques described herein can greatly enhance the utility and user experience associated with collaborating via a collaborative document.

Additionally, as described above, two different methods are often used for collaborating on a document. The first method includes a first user creating a document and sending it to a second user for feedback. The second user may modify the document and send the modified document back to the first user, such as via a communication platform, via email, or other means. As such, the first method requires a significant amount of computing resources, processing and storing multiple versions of a document. Additionally, the first method can require a significant amount of network bandwidth, communicating the versions of the document between users. Finally, this first method can lead to confusion as to which version of the document is a most recent version, which can result in frustrating user experience.

Unlike the first method, the techniques described herein provide a means by which users can access, edit, modify, comment on, and/or chat about a particular collaborative document in a single location within the communication platform. The particular collaborative document can be updated in real-time or near-real time, such that the information viewed at any given time can include up-to-date information, thereby negating any potential confusion as to a state of the document and enhancing a user experience. The techniques described herein also provide the up-to-date information without the need to send different versions of a document between users, thereby reducing the computing resources and network bandwidth associated with collaborating on a document (e.g., the collaborative document).

A second conventional method for collaborating on a document or file includes utilizing document services provided by a third-party service provider. Utilizing such a method, users of the communication platform can access a third-party document either independently of or via the communication platform. However, as described above, conventional third-party documents are limited in functionality to word processing and related functions. That is, the users can collaboratively edit and comment on a particular document, but may not be able to perform additional or alternative functions in association therewith. As such, the users of a third-party document may be required to utilize additional or alternative means by which they may communicate and/or perform other collaborative functions that relate to a project. For example, users may generate a third-party document associated with a particular project. A user computing device may run a first application to access the third-party document, a second application to discuss edits of the third-party document in real-time or near real time, and a third application to view tasks or tickets associated with the project, such as to maintain a complete picture of the status of the project. Unlike the second method that is limited to word processing functionality, the techniques described herein provide a collaborative document with enhanced functionalities that are powered by (e.g., made possible by) the communication platform. For example, these enhanced functionalities include real-time or near real-time messaging within the collaborative document, message tracking functionalities (e.g., time stamps, etc.), real-time document editing capabilities, sharing capabilities such as to include additional users in the document, object management functionalities (e.g., assigning tasks and/or tickets, monitoring task and/or ticket status, identifying relevant calendar events, and/or the like. Due to the enhanced functionalities provided by the collaborative document, the techniques described herein can reduce a number of applications run on a user computing device to monitor and/or manage a project. As such, the techniques described herein may reduce an amount of computing resources utilized in the collaboration.

Additionally, the techniques described herein include associating a document identifier (e.g., virtual space identifier) with a collaborative document. Based in part on the association with the document identifier, which can be a type of virtual space identifier of a virtual space, the communication platform can utilize pre-existing functionalities that are associated with the virtual space to provide the aforementioned functionalities of the collaborative document. By using the pre-existing functionalities to enhance capabilities associated with the collaborative document, the communication platform can provide the enhanced capabilities at a reduced overhead. In other words, by utilizing pre-existing functionalities, the communication platform can enhance collaboration at a limited computing resource cost. Additional details and examples are described below with reference to FIGS. 1-9.

FIG. 1 illustrates an example system 100 for performing techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In various examples, each group can be associated with a workspace, enabling users associated with the group to chat, meet, call, collaborate, transfer files or other data, or otherwise communicate between or among each other in a secure and private virtual space. In some examples, members of a group, and thus a workspace, can be associated with a same organization. In some examples, members of a group, and thus a workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 and/or one or more third-party computing devices 106 associated with a third-party service provider 108 (e.g., third-party resource) via one or more network(s) 110. That is, the server(s) 102, the user computing device 104, and the third-party computing device(s) 106 can transmit, receive, and/or store data (e.g., content, information, or the like) using the network(s) 110, as described herein. The user computing device 104 and the third-party computing device(s) 106 can be any suitable type of computing device, e.g., portable, semi-portable, semi-stationary, or stationary. Some examples of the third-party computing device(s) 106 can include a server computing device, such as that described above with regard to the server(s) 102, a desktop computing device, a terminal computing device, or the like.

Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 110 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 110 are well known and are not discussed herein in detail.

In at least one example, the server(s) 102 can include one or more processors 112, computer-readable media 114, one or more communication interfaces 116, and input/output devices 118. Though not illustrated in FIG. 1, the third-party computing device(s) 106 can additionally include one or more processors, such as processor(s) 112, computer-readable media, such as computer-readable media 114, communication interface(s), such as communication interface(s) 116, input/output devices, such as input/output devices 118.

In at least one example, each processor of the processor(s) 112 can be a single processing unit or multiple processing units and can include single or multiple computing units or multiple processing cores. The processor(s) 112 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 112 can be one or more hardware processors and/or logic circuits of any suitable type specifically programmed or configured to execute the algorithms and processes described herein. The processor(s) 112 can be configured to fetch and execute computer-readable instructions stored in the computer-readable media, which can program the processor(s) to perform the functions described herein.

The computer-readable media 114 can include volatile and nonvolatile memory and/or removable and non-removable media implemented in any type of technology for storage of data, such as computer-readable instructions, data structures, program modules, or other data. Such computer-readable media 114 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 114 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 114 can be used to store any number of functional components that are executable by the processor(s) 112. In many implementations, these functional components comprise instructions or programs that are executable by the processor(s) 112 and that, when executed, specifically configure the processor(s) 112 to perform the actions attributed above to the server(s) 102. Functional components stored in the computer-readable media can optionally include a messaging component 120, a document management component 122, an operating system 124, and a datastore 126.

In at least one example, the messaging component 120 can process messages between users. That is, in at least one example, the messaging component 120 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, as described herein. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform. In at least one example, the messaging component 120 can establish a communication route between and among various user computing devices, allowing the user computing devices to communicate and share data between and among each other. In at least one example, the messaging component 120 can manage such communications and/or sharing of data. In some examples, data associated with a virtual space, such a collaborative document, can be presented via a user interface. In addition, metadata associated with each message transmitted via the virtual space, such as a time stamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 120 can receive a message transmitted in association with a collaborative document. In various examples, the messaging component can identify one or more users associated with the collaborative document and can cause a rendering of the message in association with instances of the collaborative document on respective user computing devices 104. In various examples, the messaging component 120 can be configured to identify a mention or tag associated with the message transmitted in association with the collaborative document. In at least one example, the mention or tag can include an @mention of a user identifier that is associated with the communication platform. The user identifier can include a username, real name, or other unique identifier that is associated with a particular user. In response to identifying the mention or tag of the user identifier, the messaging component 120 can cause a notification to be presented on a user interface associated with the user identifier, such as in a virtual space associated with mentions and reactions. That is, the messaging component 120 can be configured to alert a particular user that they were mentioned in a collaborative document. In at least one example, the mentioning or tagging functionality and the notification functionality associated with the collaborative document can be attributable to the document identifier associated therewith.

In at least one example, the document management component 122 may receive a first request to create the collaborative document. In response to receiving the request, the document management component 122 may create the collaborative document and the first virtual space identifier, and can associate the document identifier as metadata associated with the collaborative document. That is, the document identifier may include a portion of the metadata that is not readily available or visible to the users of the collaborative document (e.g., members), but can enable functionalities associated therewith. Non-limiting examples of functionalities enabled by the document identifier include messaging functionalities performed at least in part by the messaging component 120 (e.g., message timing documentation (e.g., time stamps), audio and/or video communications, file uploads, notifications (e.g., associated with modifications to the collaborative document, new messages posted, mentions or tags, etc.), mentioning or tagging functionalities, event conveyance functionalities, workflow management and tracking, access permissions, and/or other functionalities that are enabled based on the type of document identifier, or virtual space identifier, that is associated with the collaborative document. That is, the collaborative document can leverage existing infrastructure of the communication platform in a container that is associated with the collaborative document based on an association of the document identifier with the collaborative document.

As discussed above, in some examples, the first request can be received independent of an existing virtual space in the communication platform. That is, the first request can be received in association with a user account of a requesting user. As such, the requesting user may be a sole member of the collaborative document, until the collaborative document is shared with one or more additional users. In some examples, the first request can be received in association with an existing virtual space, such as a communication channel, an audio or video conversation between two or more users, a direct messaging instance, a workspace, and/or the like. In such examples, the collaborative document may be additionally associated with a virtual space identifier associated with the existing virtual space. In at least one example, the document management component 122 can cause an affordance associated with the collaborative document to be presented in association with the existing virtual space. In such examples, the members of the existing virtual space can access the collaborative document via the affordance. Additionally or alternatively, the document management component 122 may cause another affordance associated with the collaborative document to be presented in a sidebar of a user interface associated with one or more members thereof. That is, the document management component 122 can enable access to the collaborative document via the affordance located in the sidebar of the user interface.

In various examples, the document management component 122 can identify one or more objects to be associated with the collaborative document based on the first request. The object(s) can include one or more of text (e.g., which can be editable), a task to be performed (e.g., task associated with a project or workflow associated with the collaborative document), a ticket to be resolved, a calendar invitation, a calendar instance (e.g., scheduled meeting, appointment, etc.), a file (e.g., text, audio, video, etc.), a message previously transmitted via the communication platform (e.g., in a virtual space not associated with the collaborative document, an image, a graphic, a link to a local object, a link to a remote object (e.g., third-party object), and/or the like. In some examples, the document management component 122 can identify the object(s) based on user input from the creating user. In such examples, the first request may include data associated with one or more objects to be associated with the collaborative document. Based on the data, the document management component 122 can cause the object(s) to be presented in association with the collaborative document.

In at least one example, the document management component 122 can identify one or more objects to be associated with the collaborative document based in part on membership associated therewith. That is, the document management component 122 can identify the object(s) based on user(s) associated with the collaborative document. In various examples, the document management component 122 can identify the user(s) associated with the collaborative document based on the first request. For example, the first request can include a request to create the collaborative document in association with a particular virtual space. The document management component 122 can receive the first request and associate members of the particular virtual space with the collaborative document. That is, members of the particular virtual space may automatically be associated with the collaborative document.

In various examples, the document management component 122 can be configured to identify the object(s) based on the user(s) associated with the particular virtual space. Continuing the example from above, the document management component 122 can associate members of the particular virtual space with the collaborative document and can identify one or more tasks, tickets, calendar appointments, and/or other objects that are associated with the members and/or the virtual space. For another example, the document management component 122 can receive the first request from a first user independent of (e.g., not associated with) a virtual space. The document management component 122 can identify one or more objects associated with the first user, such as based on a to-do list associated therewith. The document management component 122 can consolidate the items in the to-do list into the collaborative document and can present each item as an object therein. In various examples, the document management component 122 can be configured to cause affordances or identifiers associated with one or more objects that are associated with (e.g., assigned to, corresponding to, etc.) a particular user to be presented in the sidebar of a respective user interface. In such examples, the document management component 122 can enable easy access directly to the object(s) and/or to the data associated with the object within the collaborative document.

In various examples, the object(s) can include third-party objects that are managed or otherwise stored in association with a third-party service provider 108. For example, a third-party service provider 108 can include a scheduling platform configured to manage a calendar and scheduled events for a user, which may be stored in association with a third-party user account 132 of the user. In various examples, one or more users of the communication platform can provide credentials, tokens, or other access codes that can enable the document management component 122 to request data associated with one or more objects that are managed by or stored in association with a third-party service provider. In at least one example, the credentials, tokens, or other access codes can be stored as third-party user data 130 in association with communication platform user data 128 in the datastore 126.

In some examples, based in part on identifying that a user is associated with the collaborative document, the document management component 122 can be configured to identify third-party user data 130 associated with the user. In some examples, the document management component 122 can send a request, such as an application programming interface call, a workflow, or other request for data to the third party computing device(s) 106 associated with a third-party user account 132, to request data associated with one or more objects corresponding to the user. Continuing the example above associated with the scheduling platform third-party service provider 108, the document management component 122 can send a request to the third-party computing device(s) 106 requesting scheduling data associated with the member of the collaborative document. The request for scheduling data can include a request for data associated with appointments, meetings, and/or the like that are associated with at least one of the collaborative document, the virtual space, and/or at least one other member of the collaborative document. That is, the request can include a request for object information that is relevant to the collaborative document.

In various examples, in response to identifying and/or receiving the objects and/or data associated therewith, such as from a third-party service provider 108, the document management component 122 can cause the object(s) to be presented in association with the collaborative document. That is, the object(s) can be presented via the collaborative document such that the members thereof can access the objects to view, modify, or otherwise interact with the object(s). In various examples, the interaction enabled with the object(s) of the collaborative document can be determined based on permission settings associated with membership of the collaborative document.

In some examples, the members of a collaborative document may be granted access permissions to the collaborative document based in part on a user or organizational preference associated with the creating user of the collaborative document. In such examples, the document management component 122 can access the appropriate permission setting to associate with the members of the collaborative document based on communication platform user data 128 stored in the datastore. In some examples, the document management component 122 may additionally store the permission setting associated with the collaborative document in association with the user account(s) of the user(s) or member(s) of the collaborative document. In at least one example, the permission setting can include full editing permissions associated with the collaborative document.

In such an example, members of the collaborative document may be granted permission to contribute to and/or edit or otherwise modify the collaborative document. In other examples, the permission setting can include limited editing permission settings, such as permissions to add content but not delete content, permissions to comment but not modify text in the collaborative document, read-only permissions, and/or the like.

Additionally or alternatively, in some examples, the permissions setting may include a setting associated with sharing data within the collaborative document. In some examples, the data may include content posted or otherwise made available via other virtual spaces that are not associated with the collaborative document. That is, the document management component 122 can enable users, based on sharing permissions, to share data (e.g., messages, files, etc.) posted or otherwise made available via an unrelated virtual space within the collaborative document. In some examples, the data may be presented in the collaborative document as an object including an indicator of the virtual space, an identifier associated with a sending user, and other data. In various examples, the data may be presented as a read-only object, such that the data may not be manipulated within the collaborative document. In some examples, the data as an object, similar to other objects presented in association with the collaborative document, may be configured to serve as a root of a thread of messages. In such examples, while members of the collaborative document may not have permissions to modify the data, the members may be able to discuss and otherwise comment on the data in a messaging thread associated therewith.

In various examples, the permissions settings may include permissions to share the collaborative document and/or a portion thereof with one or more additional users. In various examples, a permissions setting may include full sharing permissions (e.g., share the collaborative document or a portion thereof with read and write capabilities), limited sharing permissions (e.g., share read-only copies of the collaborative document or a portion thereof), no sharing permissions (e.g., user not permitted to share the collaborative document with non-members). In at least one example, the permission setting associated with sharing the collaborative document can designate whether a particular user can add another user as a member of the collaborative document. In some examples, the permission setting associated with sharing the collaborative document can be based on an organizational affiliation with the requesting user and the additional user(s). For example, the permission setting can enable members to share a collaborative document with other users of a first organization, but not with users that are associated with other organizations. For another example, the permission setting can enable members to share a collaborative document with full editing permissions with members of the first organization and read-only copies of the collaborative document with members of a second organization. As such, the communication platform can enable the data presented in the collaborative document to be shared, but not modified by members of the second organization, such as to maintain integrity of the data. In some examples, the permission to share the collaborative document and/or add additional user(s) thereto can be designated by the creating user, expressly as a designated user preference and/or organization preference associated with an organization of the creating user or as a default setting associated with the communication platform.

In at least one example, the document management component 122 can be configured to receive a second request to share the collaborative document with one or more additional users. Based on a determination that the requesting user has appropriate permissions to share the collaborative document with the additional user(s), the document management component 122 can associate user identifiers associated with the additional user(s) with the collaborative document. In various examples, the second request can include a request to share the collaborative document via another virtual space. In such examples, the document management component 122 can identify members of the other virtual space and can associate the members with the collaborative document. In at least one example, the document management component 122 can identify one or more additional objects that are associated with the members of the virtual space. In some examples, the document management component 122 can associate the additional object(s) with the collaborative document such that the additional object(s) are presented in association with the collaborative document.

In various examples, in response to identifying the members of the other virtual space and associating the other virtual space with the collaborative document, the document management component 122 can cause an affordance associated with the collaborative document to be presented in association with the other virtual space, such that users of that virtual space can access the collaborative document. The affordance can include a same or similar affordance that is associated with a virtual space via which the collaborative document was created and/or initially shared. That is, the affordance may be the same or different from an affordance presented to the original members of the collaborative document, in a sidebar of the interface and/or in association with a virtual space.

In response to receiving an indication of selection of an affordance associated with a collaborative document, the document management component 122 can cause the collaborative document to be presented in a corresponding user interface. In at least one example, the viewing user can interact with the collaborative document via the user interface and the document management component 122 can process the interactions. In at least one example, the document management component 122 can update instances of the collaborative document presented to members of the collaborative document such that the data associated therewith is updated in real-time or near-real time. In various examples, the document management component 122 and/or the messaging component 120 can store updated data input in association with the collaborative document in the datastore 126. In at least one example, the datastore 126 can be configured to store data that is accessible, downloadable, manageable, and updatable. In some examples, the datastore 126 can be integrated with the server(s) 102, as shown in FIG. 1. In other examples, the datastore 126 can be located remotely from the server(s) 102 and can be accessible to the server(s) 102 and/or user computing device(s), such as the user computing device 104. Additional or alternative data can be stored in the datastore 126 and/or in one or more other data stores.

In some examples, the datastore 126 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, organization data stored in the datastore 126 can include discrete shards for each individual organization, including data related to a particular organization identification. For example, a database shard can store electronic communication data associated with members of a particular organization, which enables members of that particular organization to communicate and exchange data with other members of the same organization in real-time or near-real time. In this example, the organization itself can be the owner of the database shard and has control over where and how the related data is stored. In some examples, a database shard can store data related to two or more organizations (e.g., as in a shared channel). In at least one example, at least a portion of a shared collaborative document (e.g., document that includes users of different organizations as members) can be stored in association with a shard corresponding to each organization associated with the shared collaborative document.

In some examples, individual users can be associated with a database shard within the datastore 126 that stores data related to a particular user account. For example, communication platform user data 128 associated with a particular user account can be stored in a particular database shard. In some examples, third-party user data 130 associated with a particular user account can be associated with a database shard within the datastore 126. For example, one or more object(s) associated with a particular user that are obtained from a third-party service provider 108 can be associated with a database shard within the datastore 126.

In some examples, collaborative documents can be associated with a database shared within the datastore 126 that stores data related to a particular collaborative document. In some examples, the collaborative document can include an intra-organization collaborative document, such that members of the collaborative document are members of a same organization. In some examples, the collaborative document can include a shared or inter-organization collaborative document, such that members of the collaborative document can include members of two or more different organizations. In examples of shared collaborative documents, data associated therewith may be subject to data retention policy (e.g., policy to store data for 1 year, 2 years, etc.) associated with a particular organization of the two or more different organizations. In some examples, the particular organization can include an organization associated with an owner or administrator (e.g., creator of the collaborative document), an organization with the most conservative (e.g., longest duration) data retention policy, an organization with the least conservative (e.g., shortest duration) data retention policy, and/or the like. In such examples, the data associated with a collaborative document can be stored within the datastore 126 based on the data retention policy associated with the particular organization. In some examples, data associated with a collaborative document can be stored within the datastore 126 until the document management component 122 receives an express request to delete the collaborative document or a portion thereof. In such examples, the collaborative document and data presented in association therewith can be maintained in perpetuity until the document management component 122 receives an express request to delete all or a portion of the data associated with the collaborative document.

In at least one example, the operating system 124 can manage the processor(s) 112, computer-readable media 114, and/or hardware, software, etc. of the server(s) 102.

The communication interface(s) 116 can include one or more interfaces and hardware components for enabling communication with various other devices (e.g., the user computing device 104, third-party computing device(s) 106, etc.), such as over the network(s) 110 or directly. In some examples, the communication interface(s) 116 can facilitate communication via WebSockets, Application Programming Interfaces (APIs) (e.g., using API calls), HyperText Transfer Protocols (HTTPs), etc.

The server(s) 102 can further be equipped with various input/output devices 118 (e.g., I/O devices). Such I/O devices 118 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 112 and can be the same as or different from the processor(s) 112.

The computer-readable media 136 can comprise any of the types of computer-readable media 136 described above with reference to the computer-readable media 114 and can be the same as or different than the computer-readable media 114. Functional components stored in the computer-readable media can optionally include one or more applications 142 and an operating system 144.

The application(s) 142 can include a mobile application, a web application, and/or a desktop application. In some examples, one or more of the application(s) 142 can include third-party applications 146, which can be provided by the third-party service provider(s) 108. In at least one example, at least one application 142 can be provided by the communication platform or which can be an otherwise dedicated application. In some examples, individual user computing devices associated with the system 100 can have an instance or versioned instance of the application(s) 142, which can be downloaded from an application store, accessible via the Internet, or otherwise executable by the processor(s) 134 to perform operations as described herein. That is, the application(s) 142 can be an access point, enabling the user computing device 104 to interact with the server(s) 102 to access and/or use communication services available via the communication platform. In at least one example, the application(s) 142 can facilitate the exchange of data between and among various other user computing devices, for example via the server(s) 102. In at least one example, the application(s) 142 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 148 is shown in FIG. 1. As illustrated in FIG. 1, the user interface 148 can present data associated with the communication platform, such as via a communication platform application 142. In various examples, the user interface 148 can be configured to present data associated with one or more collaborative documents, one or more communication channels, one or more direct messages and, in some examples, one or more workspaces. That is, in some examples, the user interface 148 can present data associated with the one or more collaborative documents (e.g., objects, messages, etc.), messages sent via one or more communication channels and/or via direct message(s) in a single user interface so that the user (e.g., of the user computing device 104) can access and/or interact with data associated with the collaborative document(s), the multiple channels, and/or direct messaging instances that he or she is associated with and/or otherwise communicate with other users associated with the collaborative document(s), multiple channels, and/or direct messaging instances. As discussed above, the collaborative document(s), communication channels, and/or direct messaging instances can be internal to an organization of the user or externally shared (e.g., include users from two or more organizations, include a first user from a first organization and second user not associated with an organization).

In some examples, the user interface 148 can include a first section 150, or pane, that includes indicator(s) (e.g., user interface element(s) or object(s)) representing data with which the user (e.g., account of the user) is associated. Additional details associated with the first section 150 and indicator(s) are described below with reference to FIG. 2A.

In at least one example, the user interface 148 can include a second section 152, or pane, that can be associated with one or more collaborative documents. As a non-limiting example, the data presented via the second section 152 can include a document interface 154 via which a viewing user may access one or more collaborative documents that are associated with the user. That is, the user may access the collaborative document(s) with which the user is a member via the document interface 154. In at least one example, the collaborative documents can be organized (e.g., ordered presentation) based on one or more ranking criteria, such as a most recent time the user accessed the collaborative document(s), a frequency of access of the collaborative document(s), an activity level (e.g., amount of interaction) within the collaborative document(s), a user preference associated with collaborative document(s) (e.g., marked as "favorite," etc.). In some examples, a collaborative document may be created from a channel or an audio-based, synchronous or asynchronous meeting.

In at least one example, in response to receiving an indication of selection of a particular collaborative document (e.g., an affordance associated therewith) within the document interface 154, the document management component 122 can cause the selected document to be presented in the second section 152. Additional details of the presentation of a particular document are described below with respect to at least FIG. 2B. Additionally or alternatively, the second section 152 can be configured to present data associated with a data feed (or, "feed") indicating messages posted to and/or actions taken with respect to one or more channels, direct messages, and/or other virtual spaces for facilitating communications (e.g., a virtual space associated with event(s) and/or action(s), etc.) as described herein.

In at least one example, the operating system 144 can manage the processor(s) 134, computer-readable media 136, hardware, software, etc. of the user computing device 104.

The communication interface(s) 138 can include one or more interfaces and hardware components for enabling communication with various other devices (e.g., the user computing device 104), such as over the network(s) 110 or directly. In some examples, the communication interface(s) 138 can facilitate communication via WebSockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the application(s) 142, techniques described herein can be performed by any other component, or combination of components, which can be associated with the server(s) 102, the user computing device 104, or a combination thereof.

Figure 2A:
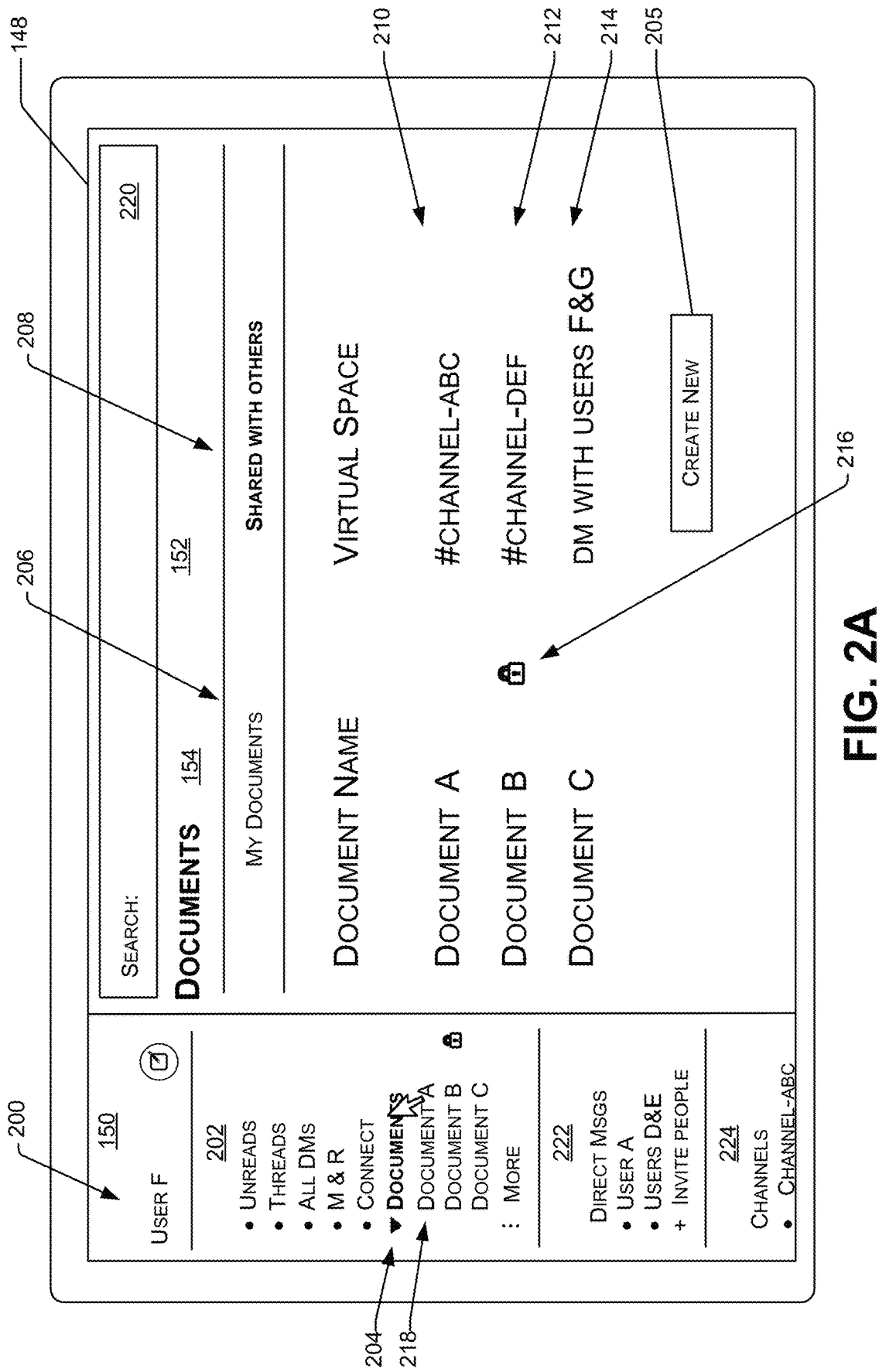
FIG. 2A illustrates an example user interface for enabling access to one or more documents associated with a user account.

FIG. 2A illustrates the example user interface 148 in which the document interface 154 is presented in the second section 152. As discussed above, the user interface 148 can include a first section 150 that includes user interface element(s) representing virtual space(s) associated with the workspace(s) with which the user 200 (e.g., user account of the user) is associated. In at least one example, the first section 150 can include one or more sub-sections, which can represent different virtual spaces. For example, a first sub-section 202 can include user interface elements representing virtual spaces that can aggregate data associated with a plurality of channels and/or workspaces. In at least one example, each virtual space can be associated with a user interface element in the first sub-section 202. In some examples, a user interface element can be associated with an actuation mechanism, that when actuated, can cause an application, such as application 142, to present data associated with the corresponding virtual space via a second section 152 of the user interface 148.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 152, for example in a feed.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 152, for example in a feed.

In at least one example, a virtual space can be associated with all direct messaging instances (e.g., DMs) with which the user is associated. That is, in some examples, if the user requests to access the virtual space associated with "all DMs," data associated with each direct messaging instance of which the user is associated can be presented in the second section 152, for example in a feed.

In another example, a virtual space associated with "mentions and reactions" (e.g., "M & R") can be associated with messages or threads where the user 200 (e.g., User F) has been mentioned (e.g., via a tag) or another user has reacted (e.g., via an emoji, reaction, or the like) to a message object or thread posted by the first user 200. In at least one example, a collaborative document or portion thereof in which the user 200 is mentioned or tagged may be included in association with the mentions and reactions virtual space.

In at least one example, a virtual space can be associated with facilitating communications between the user 200 and other users of the communication platform. For example, "connect" can be associated with enabling the user 200 to generate invitations to communicate with one or more other users with whom the user 200 does not have an established connection via the communication platform (e.g., not previously associated with).

In at least one example, a virtual space can be associated with enabling access to one or more collaborative documents associated with a user account of a user 200. For example, the first sub-section 202 can include an affordance or user interface element associated with "documents" (e.g., document affordance 204) such that, in response to a selection thereof, the document management component 122 can cause the collaborative document(s) with which the user 200 is associated to be presented in the second section 152. That is, in response to receiving an indication of selection of the document affordance 204, the document interface 154 can be presented in the second region.

In at least one example, the documents interface 154 can include a new document affordance 205 that, when selected by the user 200, can initiate the creation of a new collaborative document. Additional details associated with creating a new collaborative document are described below with regard to FIGS. 3A-3D. Additionally, in at least one example, the documents interface 154 can include one or more lists of collaborative document(s) with which the user account of the user 200 is associated. In some examples, the documents interface 154 can include user documents 206 (illustrated as "My Documents"). In some examples, the user documents 206 can include a list of one or more documents in which the user 200 is a sole member. That is, the user documents 206 can include personal documents associated with the user account of the user 200. For example, a document included in the user documents 206 can include a personal task list (e.g., to-do list) for the user 200 to manage.

In various examples, the documents interface 154 can additionally or alternatively include shared documents 208. The shared documents 208 can include documents that are shared with at least one other user of the communication platform. As described above, a collaborative document can be shared via a virtual space with one or more other users who may subsequently become members of the collaborative document (e.g., based on the share). In at least one example, a virtual space or other user with which each collaborative document is associated may be presented via the documents interface 154. As an illustrative example, the documents interface 154 of FIG. 2A includes a first document 210 (e.g., Document A) associated with a first channel (e.g., #channel-abc), a second document 212 (e.g., Document B) associated with a second channel (e.g., #channel-def), and a third document 214 (e.g., Document C) associated with a direct messaging instance between the user 200 and another user (e.g., User G). Though illustrated as being associated with separate pages, this is not intended to be so limiting, and the user documents 206 and shared documents 208 can be presented in a single page of the documents interface 154. In some examples, clicking on the document (or otherwise selecting the document) will cause the document to be opened within the associated virtual space (e.g., clicking on Document A will cause the document to be opened from a second section 152 associated with #channel-ABC.)

In various examples, the documents interface 154 may include additional or alternative details associated with the first document 210, the second document 212, and/or the third document 214. Non-limiting examples of additional or alternative details can include an indication of a creating user (e.g., administrator), an organization associated with the creating user (e.g., administrative organization), a notification of unread data (e.g., bolded document name, indication of a new message associated with the collaborative document, etc.), an indication of privacy settings, and/or the like. For example, the second document 212 includes a privacy indicator 216 to indicate that the second document 212 is private and, as such, may have limited sharing and/or viewing permissions associated therewith.

In various examples, the documents interface 154 can include a search mechanism 220 via which the user 200 can search for and identify a particular collaborative document that is associated with the user account of the user 200. In some examples, the document management component 122 can be configured to receive input via the search mechanism 220 and identify one or more relevant collaborative documents based on the input. The input can include a name, topic, a member (e.g., username or identifier), associated virtual space, and/or other details associated with the collaborative document. In at least one example, in response to receiving the input, the document management component 122 can cause the one or more indicators associated with one or more identified collaborative documents to be presented in association with the documents interface 154. In such examples, the indicator(s) can each be selectable to render the associated collaborative document in the second section 152.

Figure 2B:
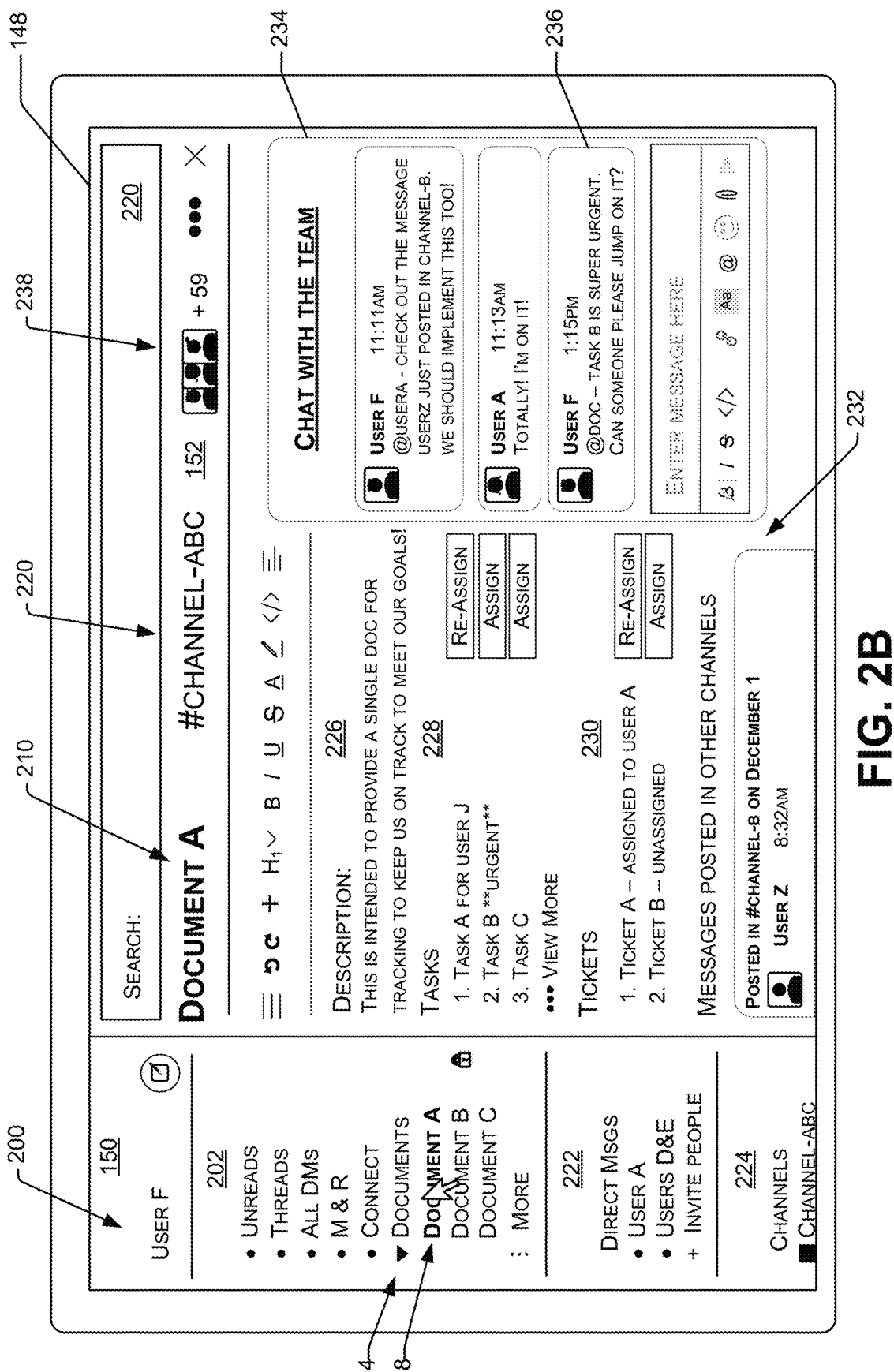
FIG. 2B illustrates an example user interface associated with a collaborative document.

In the illustrative example of FIG. 2A, each of the first document 210, the second document 212, and the third document 214 include affordances or user interface elements that, when selected by the user 200, cause a respective collaborative document to be presented in the second section 152 of the user interface 148. Additionally or alternatively, the user 200 may access the first document 210, the second document 212, and/or the third document 214 via respective document affordances 218 (e.g., user interface elements) located in the first sub-section 202. That is, in response to receiving an indication of selection of a document affordance 218, the document management component 122 may cause a respective collaborative document to be presented in the second section 152 of the user interface 148. For example, in response to receiving an indication of selection of an affordance associated with the first document 210, the document management component 122 can cause the first document 210 to be presented in the second section 152, as illustrated in FIG. 2B.

In at least one example, the first section 150 of the user interface 148 can include a second sub-section 222, or sub-pane, that includes include indicators representative of communications with individual users or multiple specified users (e.g., instead of all, or a subset of, members of an organization). Such communications can be referred to as "direct messaging instances" or "direct messages." That is, the second sub-section 222, or sub-pane, can include indicators representative of virtual spaces that are associated with private messages between two or more users (e.g., direct messaging instances).

In at least one example, the first section 150 of the user interface 148 can include a third sub-section 224, or sub-pane, that includes indicators representing communication channels with which the user 200 is associated. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user can be associated with both workspaces, or can only be associated with one of the workspaces. In some examples, the communication channels represented can be associated with combinations of communication channels associated with a single workspace and communication channels associated with different workspaces.

In some examples, the third sub-section 224 can depict all communication channels, or a subset of all communication channels, that the user has permission to access (e.g., as determined by the permission data stored in association with communication platform user data 128). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the third sub-section 224 can depict all communication channels, or a subset of all communication channels, that the user is a member of, and the user can interact with the user interface 148 to browse or view other communication channels that the user is not a member of but are not currently displayed in the third sub-section 224. In some examples, different types of communication channels (e.g., public, private, shared, cross-workspace, etc.) can be in different sections of the third sub-section 224, or can have their own sub-regions or sub-panes in the user interface 148. For example, shared channels can be presented in association with the "connect" indicator illustrated in the first sub-section 202, such as in a drop-down menu. In some examples, communication channels associated with different workspaces can be in different sections of the third sub-section 224, or can have their own regions or panes in the user interface 148.

In some examples, the indicators can be associated with graphical elements that visually differentiate types of communication channels. For example, a first communication channel can be associated with a square visual element and a second communication channel can be associated with a circle visual element. As a non-limiting example, and for the purpose of this discussion, the square visual element can indicate that the user is not a current member of the first channel, whereas the circle visual element can indicate that the user is a current member of second channel. In some examples, additional or alternative graphical elements can be used to differentiate between public communication channels, private communication channels, shared communication channels, communication channels associated with different workspaces, and the like. In other examples, communication channels that the user is not a current member of may not be displayed in the third sub-section 224 of the user interface 148. In such examples, the user can navigate to a different interface (not shown) to browse additional channels that are accessible to the user but to which the user is not currently a member.

In various examples, in response to receiving an indication of selection of an indicator associated with a particular communication channel or other virtual space, the associated communication or other virtual space can be presented in the second section 152. As discussed above, in examples in which a document is associated with a particular virtual space, the collaborative document may be accessed in association therewith. That is, the document management component 122 may cause display of an affordance associated with the collaborative document via a virtual space that is associated therewith. In various examples, in response to receiving an indication of selection of the affordance associated with the collaborative document that is presented via the virtual space, the document management component may cause the collaborative document to be presented in the second section 152.

FIG. 2B illustrates a selected document (e.g., first document 210) presented in the second section 152 of the user interface 148, such as based on a selection, by the user 200, of an affordance associated therewith. As discussed above, the selection can include a selection of an affordance presented via a virtual space (not illustrated), via the sidebar of the user interface, and/or via the document interface 154.

As discussed above, a collaborative document, such as the first document 210, can support editable text and/or objects that can be ordered, added, deleted, modified, and/or the like. As an illustrative non-limiting example, the first document 210 includes an editable text section 226, a first object section 228, a second object section 230, and a third object section 232. In some examples, the editable text section 226 can represent a portion of the first document 210 in which members may input, modify, and/or comment on text synchronously or asynchronously, such as in a collaborative effort to refine text associated with the first portion of the first document. In such examples, the editable text section 226 can include word processing functionalities.

In various examples, the first object section 228, the second object section 230, and/or the third object section 232 can each include one or more objects. An object can include, but is not limited to, text, audio and/or video files, a task, a ticket to be resolved, an event (e.g., scheduled event, calendar invitation, calendar instance, etc.), a message previously transmitted via the communication platform, an image, a graphic, a link to a local object, a link to a remote object (e.g., third-party object), a file, and/or the like. In some examples, each of the first object section 228, the second object section 230, and the third object section 232 may include different types of objects. For example, the first object section 228 includes one or more tasks to be performed in association with the first document 210, the second object section 230 includes tickets to be resolved in association with the first document 210, and the third object section 232 includes one or more messages posted in another virtual space and shared via the first document 210. Though this is merely provided for illustrative purposes and is not intended to be so limiting.

In various examples, each of the objects in the first object section 228, the second object section 230, and the third object section 232 can include a root of a messaging channel or thread. That is, members of the first document 210 can communicate via the messaging channel or thread associated with a respective object. In some examples, the user 200 can initiate a thread by selecting (e.g., right click) a particular object of the first document 210. In such examples, a pop-up window or other interface element may be presented via which can enable the user 200 to communicate with other users about the particular object.

In some examples, the first document 210 can include a messaging interface 234 via which the members of the first document 210 can send messages between and among each other. In the illustrative example, the messaging interface 234 is illustrated in a flex pane of the user interface 148. That is, the messaging interface 234 is presented adjacent to data associated with the first document 210 (e.g., editable text section 226, objects, etc.). In other examples, the messaging interface 234 can be presented as a pop-up window or overlay presented over the data associated with the first document 210.

In some examples, the messaging component 120 can cause the messages associated with the messaging interface 234 (and the threads described above) to be presented in association with the first document 210 in real-time or near-real time. In at least one example, the messaging component 120 can be configured to identify a mention of a user or a document in a message 236. Based on an identification of the mention of the user (e.g., @user, !user, etc.) or the document (e.g., @doc, @docA, etc.), the messaging component 120 can cause a notification to be presented to the mentioned user or, in the example of a document mention, to all of the users associated with the first document. In some examples, the notification can be presented in association with the first document 210, such as in the document interface 154 and/or in a sidebar of the user interface 148. For example, in response to receiving an indication of a mention of the document (e.g., @doc) in the message 236, the messaging component 120 can cause the document affordance 218 associated with the first document 210 to be rendered in bold text. For another example, the document affordance 218 associated with the first document 210 may have associated therewith a number or other indicator to alert a viewing user that there is a mention in the messaging interface 234. Additionally or alternatively, the messaging component 120 may cause the notification to be presented in association with the mentions and reactions indicator in the first sub-section 202.

Additionally, in some examples, the first document 210 may include a presence indicator 238. In some examples, the presence indicator 238 may include an indication of members of the first document 210. The indication of the members may include the number of users that are associated with the first document 210 and/or additional information about the users, such as a username, real name, avatar, and/or the like. In some examples, the presence indicator 238 may include an indication of members of the first document 210 that are currently viewing and/or interacting with the first document 210. For example, the three avatars presented in the presence indicator 238 may indicate that three members are currently viewing and/or interacting with the first document 210, while the 59 other members are not currently viewing and/or interacting with the first document 210. In some examples, the presence indicator 238 may include the organizations or groups associated with the users who are viewing and/or interacting with the first document 210. Though this is merely an illustrative example and other presence indicators are contemplated herein, such as highlighted usernames or avatars, symbols associated with actively viewing members, and/or the like. In at least one example, the presence indicator 238 may include a user interface element configured to enable the user 200 to view a list of the members of the document. That is, in response to receiving an indication of selection of the presence indicator 238, the document management component 122 can cause a presentation of the list of members in association with the second region (e.g., in lieu of the first document 210, in a pop-up window associated with the first document 210, etc.).

Additional functionalities associated with collaborative documents (e.g., the first document 210) are described in detail below with respect to FIGS. 3A-7C.

Figure 3A:
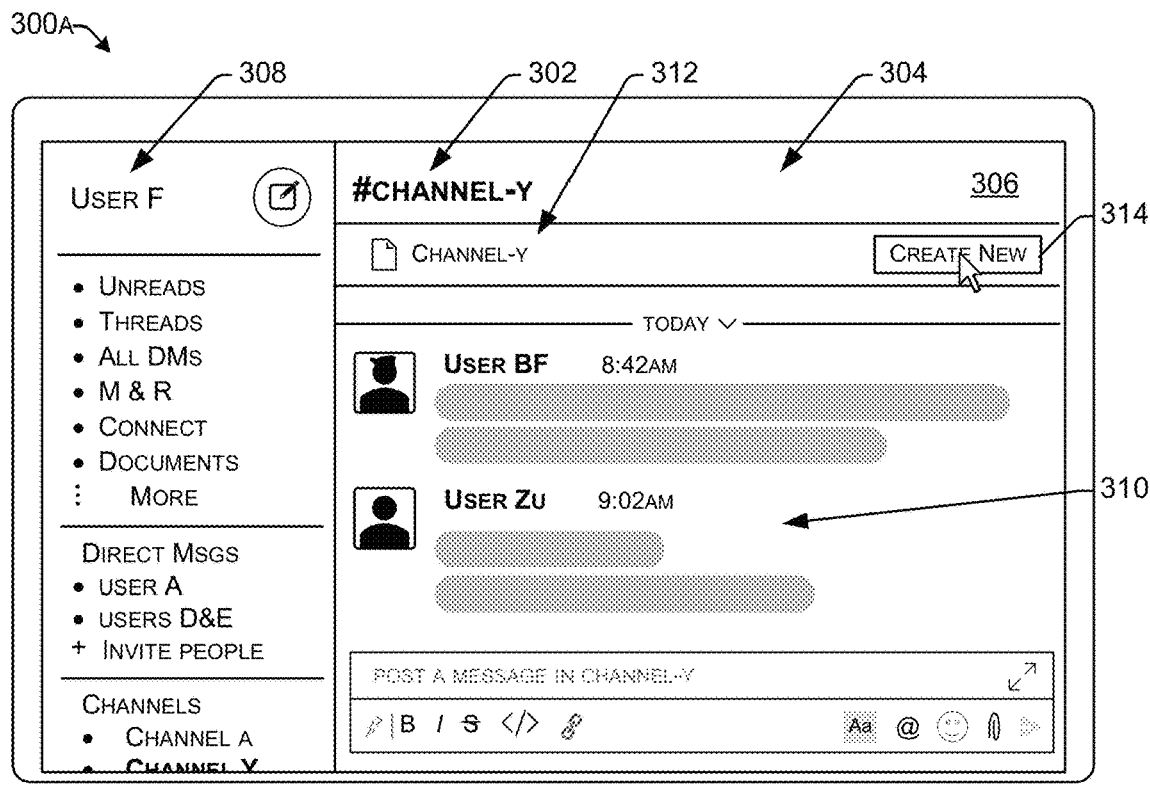
FIGS. 3A-3D illustrate example user interfaces for creating a new document in association with a virtual space of a communication platform, as described herein.

FIGS. 3A-3D illustrate example user interfaces for creating a new document in association with a virtual space 302 of a communication platform. FIG. 3A illustrates an example user interface 300a in which a feed 304 associated with the virtual space 302 (e.g., channel-y) is presented in a second region 306, which may correspond to second section 152. Though illustrated as a communication channel, this is not intended to be so limiting, and the virtual space 302 can include an alternative type of virtual space, such as direct messaging instance, an audio or video conversation, and/or the like. That is, the communication platform can be configured to enable a user 308 to initiate a creation of a new document in association with one or more different types of virtual spaces.

As illustrated in FIG. 3A, the feed 304 can include one or more messages transmitted in association with the virtual space 302. The messages can include text, attached files (e.g., text, audio, video, etc.), emojis, reaction emojis, links, and/or the like. In various examples, the messages 310 can be presented in order based on a transmission time associated therewith (e.g., timestamp). In such examples, a messaging component of the communication platform, such as messaging component 120, can cause the messages to be presented in an appropriate order.

In various examples, the virtual space 302 can include an associated collaborative document 312. In such examples, the collaborative document 312 can include a collaborative document or container for storing data to be persistently available via the virtual space 302. That is, the collaborative document 312 can provide a means by which members of the virtual space 302 can store data such that it is persistently available.

In various examples, the virtual space 302 may include a new document affordance 314 that, when selected by the user 308, can initiate the creation of a new collaborative document in association with the virtual space 302. In some examples, the new document affordance 314 may be accessed through a shortcuts menu associated with the channel (e.g., a bookmark bar, workflow menu, shortcut menu, and the like).

Figure 3B:
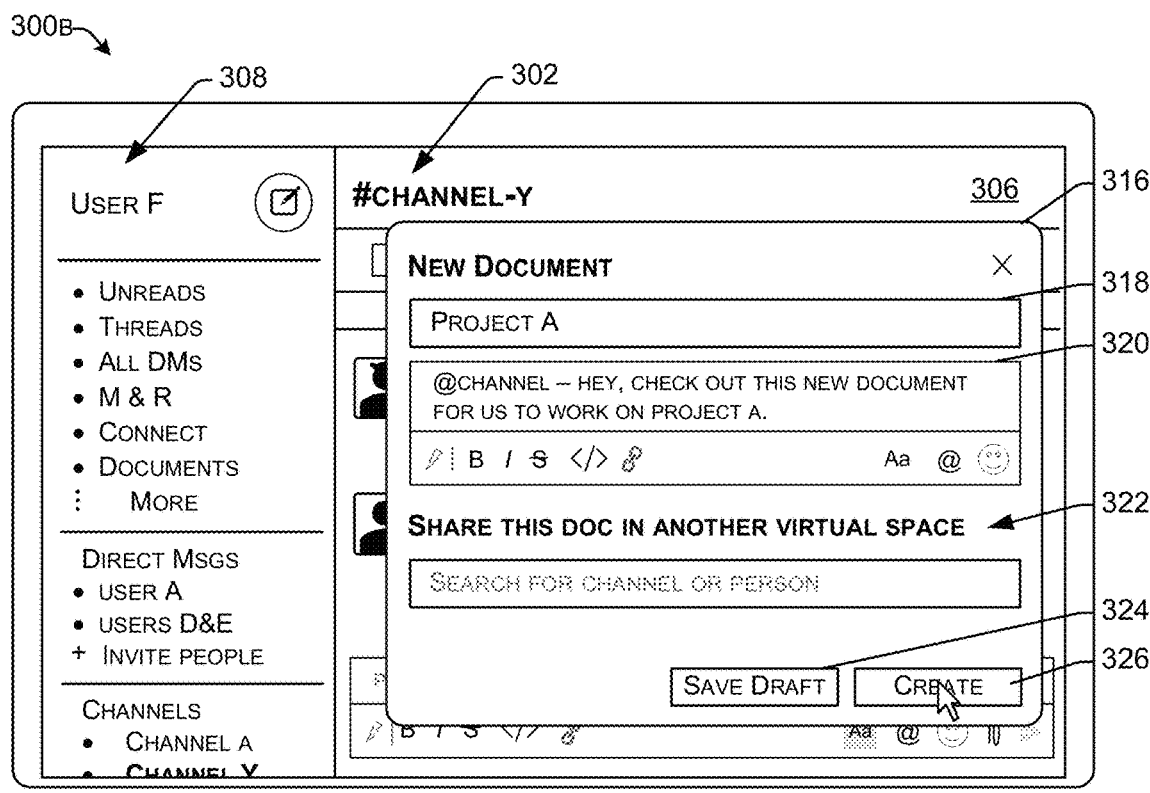

FIG. 3B illustrates an example user interface 300b in which a new document window 316 is presented. In at least one example, the new document window 316 can be configured to enable the user 308 to input information associated with the new collaborative document to be created. In the illustrative example, the new document window 316 includes a title entry box 318, a message entry box 320, and a sharing entry box 322. Though this is not intended to be so limiting and the new document window 316 may include additional or alternative entry boxes. For example, the new document window 316 may include a topic or description entry box in which the user 308 can include a topic or description to be associated with the new collaborative document.

In various examples, the title entry box 318 can be configured to receive user input associated with a title to be associated with the new collaborative document. In such example, in response to receiving input in association with the title entry box 318, the communication platform can associate the input title with the new collaborative document. In some examples, the message entry box 320 can enable the user 308 to input a message to send to members of the virtual space 302 about the new collaborative document. In various examples, the message and/or a link to or affordance associated with the new collaborative document can be presented in association with the feed 304 illustrated in FIG. 3A.

In various examples, the communication platform can enable the user 308 to additionally share the new collaborative document in another virtual space that is different from virtual space 302, such as by including a name or other identifier associated with the other virtual space in the sharing entry box 322. That is, the members of the virtual space 302 and members if the other virtual space may be members of the new collaborative document. In some examples, the sharing entry box 322 can include a drop down menu via which the user 308 can select the other virtual space to share the new collaborative document. In such examples, virtual spaces in which the user 308 is associated can be presented via the drop-down menu.

In some examples, the communication platform can additionally or alternatively enable the user 308 to share the new collaborative document with an additional user that is not associated with the virtual space 302. In such examples, in response to receiving an input of an identifier associated with another user of the communication platform, the communication platform may associate the other user with the new collaborative document. That is, the members of the virtual space 302 and the other user may be members of the new collaborative document. In some examples, other users with whom the user 308 is connected via the communication platform can be presented and/or selected via the drop-down menu associated with the sharing entry box 322.

In various examples, the new document window 316 can include a save draft affordance 324 that, when selected by the user 308, causes inputs associated with one or more of the title entry box 318, the message entry box 320, and the sharing entry box 322 to be stored for future use, such as to create the new collaborative document at another time in the future.

In various examples, the new document window 316 can include a create affordance 326 that, when selected by the user 308, causes the new collaborative document to be created in association with the virtual space 302. In various examples, an indication of selection of the create affordance 326 can include a first request, from the user (e.g., via a client associated therewith), to create the new collaborative document.

Figure 3C:
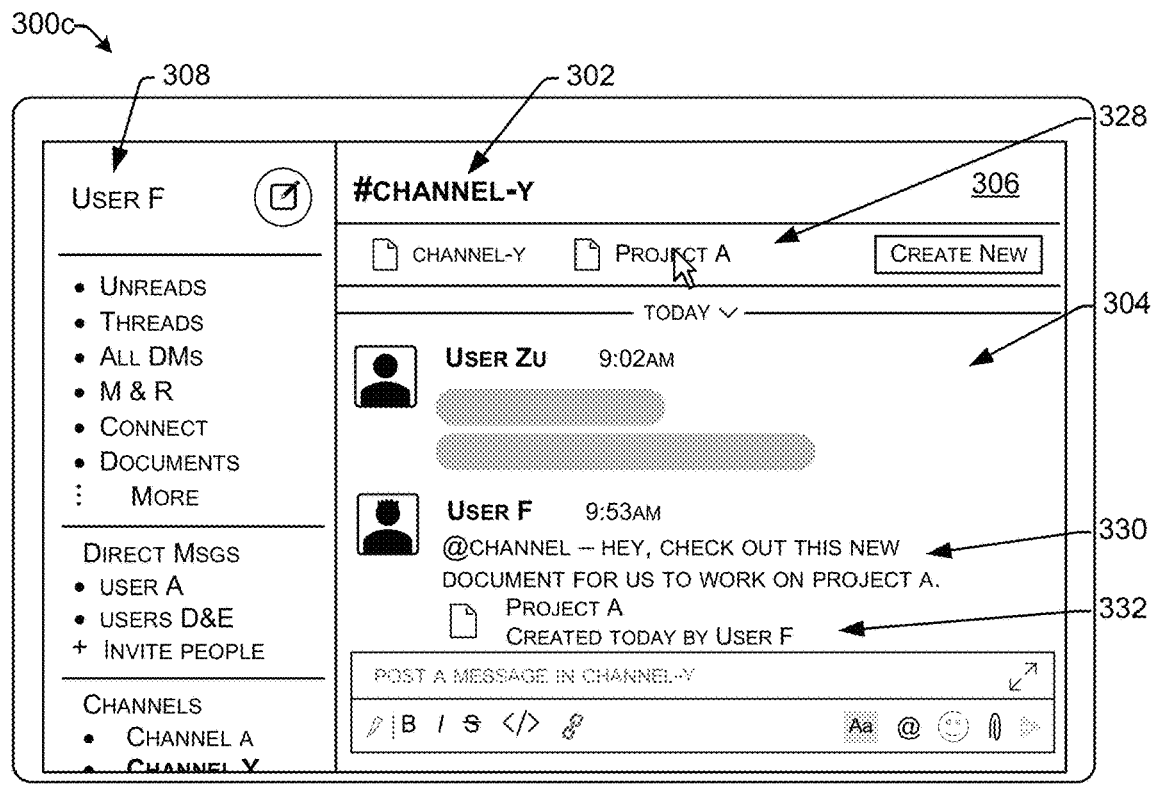

FIG. 3C illustrates an example user interface 300c in which a new collaborative document affordance 328 associated with the new collaborative document is presented in association with the virtual space 302 (e.g., #Channel-Y). Additionally, a message 330 input via the message entry box 320 can be published or otherwise presented in association with the feed 304 of the virtual space 302. As discussed above, in some examples, the message 330 can include a link 332 associated with the new collaborative document. That is, in response to either the new collaborative document affordance 328 or the link 332, the communication platform can cause the new collaborative document to be presented in the second region 306.

Figure 3D:
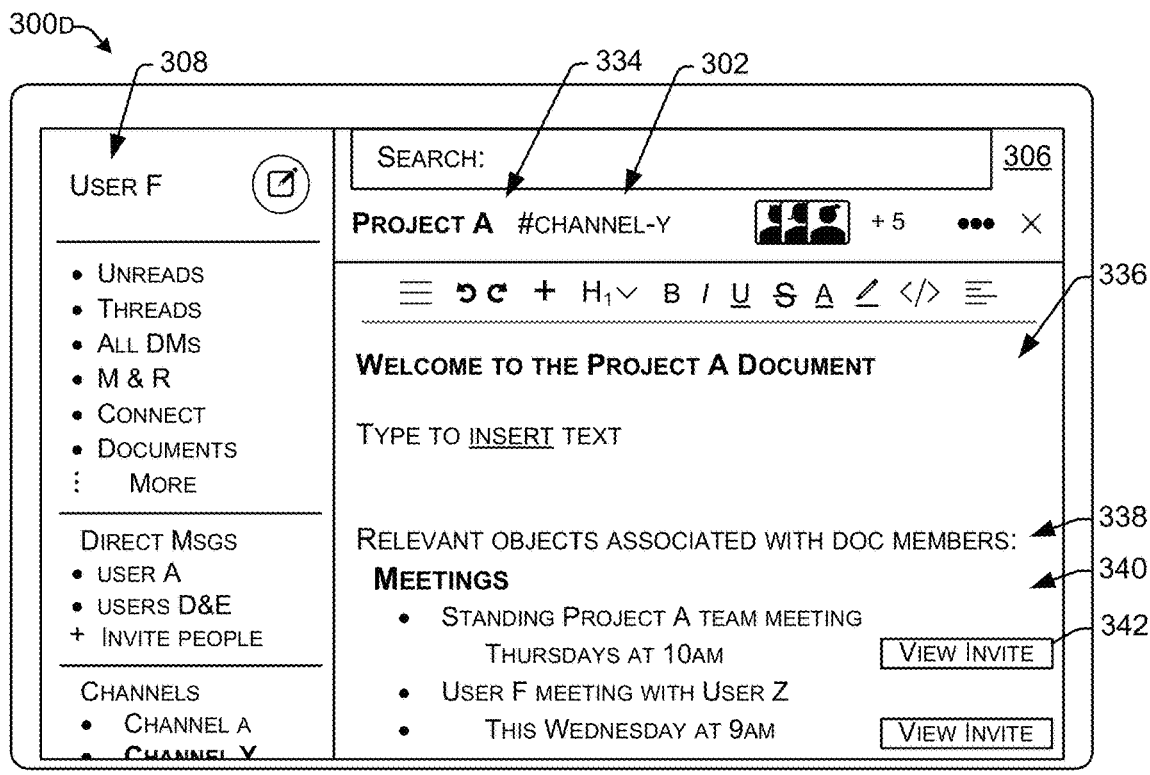

FIG. 3D illustrates an example user interface 300d in which the new collaborative document 334 is presented in the second region 306, such as in response to a selection of the new collaborative document affordance 328 or the link 332. In various examples, the new collaborative document 334 can include an indication of association with the virtual space 302. In the illustrative example, an indicator of the virtual space 302 (e.g., name) is presented in association with the title of the new collaborative document 334. In other examples, the indicator of the virtual space 302 may be presented in an alternative location.

As discussed above, the new collaborative document 334 can include an editable text section 336 and an object section 338. At least because the new collaborative document was newly created, the editable text section 336 can include an instruction to indicate that text can be inserted into the editable text section 336. In some examples, the instruction may be removed in response to a member of the new collaborative document 334, such as user 308 adding text to the editable text section 336.

In various examples, the object section 338 can include one or more objects 340 associated with new collaborative document. An object 340 can include, but is not limited to, text (e.g., which can be editable), audio and/or video files, a task, a ticket to be resolved, an event (e.g., scheduled event, calendar invitation, calendar instance, etc.), a message previously transmitted via the communication platform, an image, a graphic, a link to a local object, a link to a remote object (e.g., third-party object), a file, and/or the like. In the illustrative example of FIG. 3D, the objects 340 include meetings between and among members of the virtual space 302. Though this is not intended to be so limiting and additional or alternative object(s) may be presented in association with the new collaborative document 334.

In some examples, the communication platform can identify the object(s) based on input from the user 308, such as when creating the new collaborative document 334. For example, the communication platform can identify express input of objects to associate with the new collaborative document 334. For another example, the communication platform can identify object(s) based on a title or description of the new collaborative document 334, such as that input during a creation thereof. In such an example, the communication platform can identify object(s) with a same or similar name, topic, or description as the title or description associated with the new collaborative document (e.g., "standing Project A team meeting").

In some examples, the communication platform can identify the object(s) based on objects that are associated with one or more members of the new collaborative document 334 and/or objects that are associated with the virtual space 302. In such examples, the communication platform can identify objects that are associated with at least one of the virtual space 302 or at least one of the members thereof. In response to identifying the object(s) 340, the communication platform can cause the identified objects to be presented via the new collaborative document 334.

In some examples, the object(s) 340 included in the new collaborative document 334 can be interactable. That is, an object 340 can include a respective affordance 342 or user interface element that, when selected by the user 308, causes the object 340 to be presented. For example, in response to receiving an indication of selection of the affordance 342, the user 308 may view an invitation about a standing Project A team meeting.

Figure 4A:
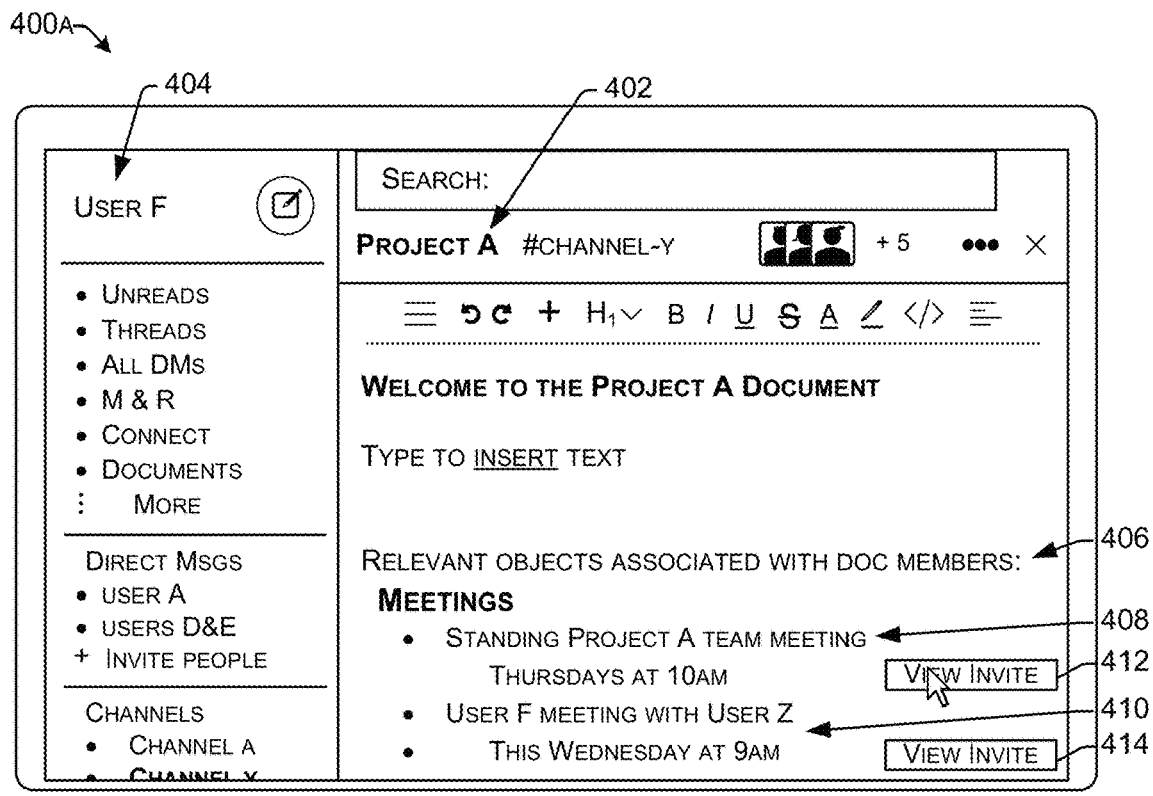
FIGS. 4A and 4B illustrate example user interfaces for viewing objects associated with a collaborative document, as described herein.
Figure 4B:
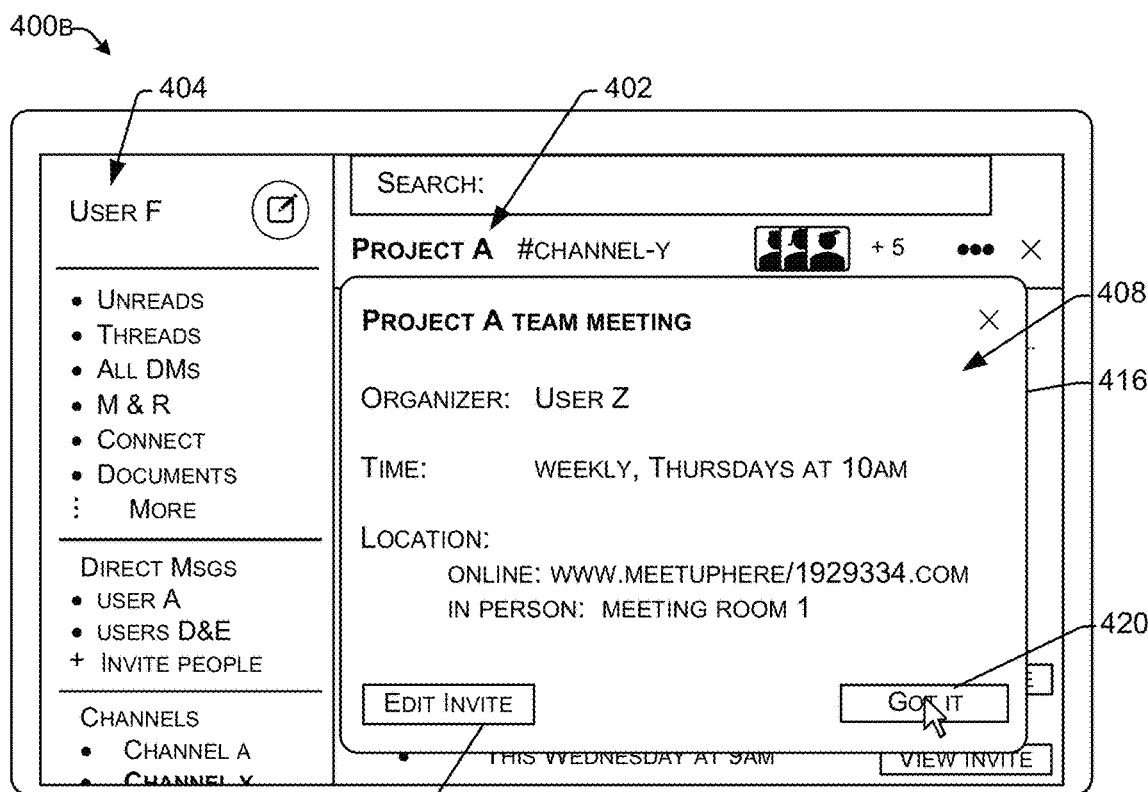

FIGS. 4A and 4B illustrate example user interfaces for viewing objects associated with a collaborative document, as described herein. FIG. 4A illustrates an example user interface 400a in which a collaborative document 402 associated with a user account of a user 404 is presented.

As discussed above, the collaborative document 402, such as new collaborative document 334, first document 210, etc., can be presented in the user interface 400a in response to a selection, by the user 404, of an affordance associated therewith.

As discussed above, the collaborative document 402 can include an object section 406, such as object section 338, can include one or more objects that are identified as being associated with the collaborative document 402. In the illustrative example, the object section 406 includes a first object 408 and a second object 410, though this is merely an example and is not intended to be so limiting, as additional or alternative objects of different object types are contemplated herein.

As illustrated in FIG. 4A, the object section 406 can include a first affordance 412 associated with the first object 408 and a second affordance 414 associated with the second object 410. In various examples, the first affordance 412 and the second affordance 414 may be individually selectable to cause a respective object to be presented. For example, in response to receiving an indication of selection of the first affordance 412, the communication platform may cause the first object 408 to be presented in association with or independently of the collaborative document 402.

FIG. 4B illustrates an example user interface 400b in which the first object 408 is presented, such as in response to a user selection of the first affordance 412 associated therewith. In the illustrative example, data associated with the first object 408 is presented in a pop-up window 416 associated with the collaborative document 402. In other examples, the first object 408 can be presented in association with another application (e.g., third-party application, etc.) associated therewith. In such examples, the first affordance 412 may include a link to the first object 408 in another application that is different from the application associated with the communication platform. That is, the first affordance 412 may include a direct link to the first object 408 via which the data associated therewith may be viewed.

In the illustrative example, the data includes an organizer, time, and location associated with the first object 408. Additional or alternative data associated with the first object 408 is contemplated herein. For example, different types of objects may be associated with different types of data. As such, in response to selection of an affordance associated with a different type of object (other than a meeting invitation), the communication platform can cause different data to be presented via the associated pop-up window 416. In some examples, a selection of an object, a document, or the like can cause the referenced object to be displayed in a window separate from the communication platform (e.g., in a standalone window or instance of the user interface).

In the illustrative example, the pop-up window 416 includes an editing option 418 that, when selected, enables the user 404 to edit the meeting invitation. In some examples, the editing option 418 can be presented based on a determination that the user 404 has appropriate permissions to edit the first object 408. Additionally, as illustrated, the pop-up window 416 can include a confirmation option 420 that, when selected, causes the pop-up window 416 to close. In some examples, in response to receiving an indication of selection of the confirmation option 420, the communication platform may store an indication of confirmation by the user 404 of the first object 408. In some examples, the user 404 may additionally or alternatively close the pop-up window 416 by selecting an "X" associated therewith, such as that illustrated at the top right corner.

Figure 5A:
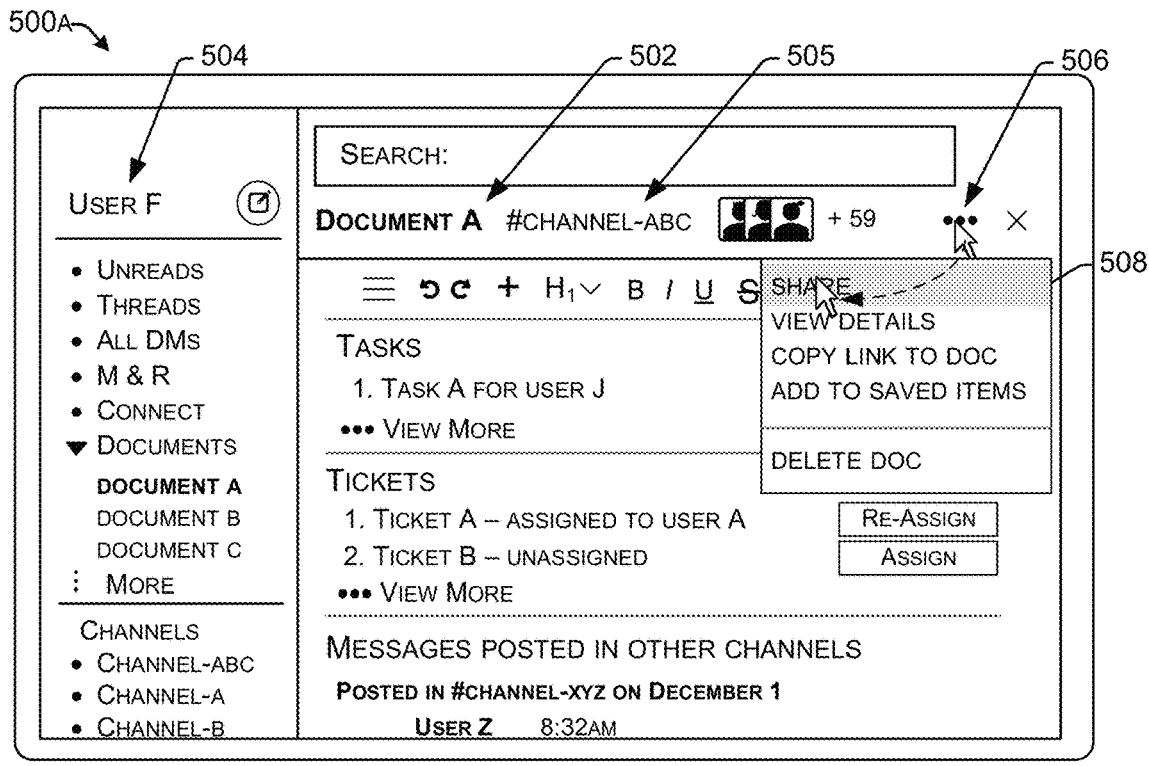
FIGS. 5A-5E illustrate example user interfaces for sharing a collaborative document with members of a virtual space and presenting objects in association with the document based on data associated with the members of the virtual space, as described herein.

FIGS. 5A-5E illustrate example user interfaces for sharing a collaborative document with members of a virtual space and presenting objects in association with the document based on data associated with the members of the virtual space, as described herein. FIG. 5A illustrate an example user interface 500a in which a collaborative document 502 associated with a user account of a user 504 is presented. In the illustrative example, the collaborative document 502 is associated with a first virtual space 505 (e.g., #channel-abc).

In various examples, the collaborative document 502 can include a more options control 506 in which the user 504 can access a menu 508 of actions that can be performed with respect to the collaborative document 502. In the illustrative example, the menu 508 includes a share option, a view details option, a copy link to document option, an add to saved items option, and a delete document option, though additional or alternative options for interacting with the collaborative document 502 are contemplated herein. In various examples, one or more of the menu options presented via the menu 508 may be presented based on permission settings associated with a user account of the user 504. For example, the delete document option may be presented based on a determination that the user 504 created the collaborative document and is therefore an administrator of the collaborative document. For another example, the share option may be presented based on a determination that the user account of the user 504 includes permissions to share the collaborative document 502.

In various examples, in response to receiving an indication of selection of the share option via the menu 508, the communication platform may initiate a document share associated with the collaborative document 502.

Figure 5B:
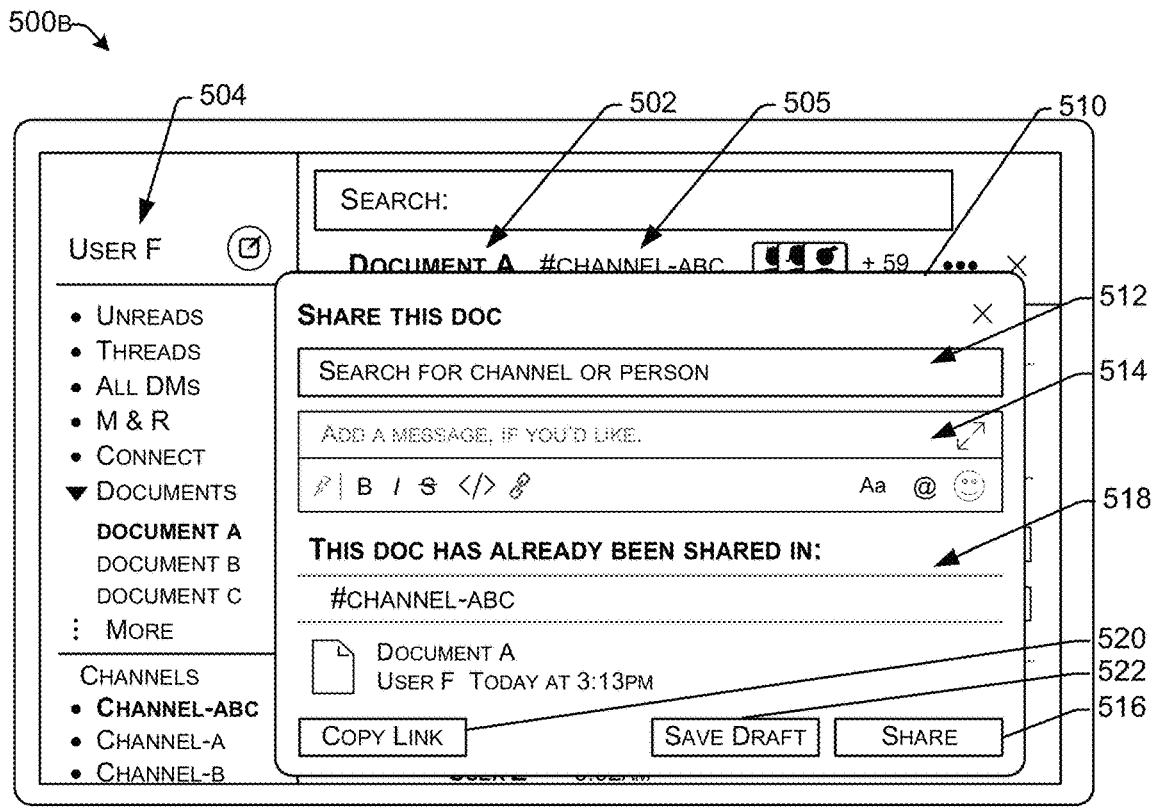

FIG. 5B illustrates an example user interface 500b in which a document share window 510 is presented in association with the collaborative document 502. In the illustrative example, the document share window 510 includes an overlay over the collaborative document 502. In other examples, the document share window 510 or page may be presented in lieu of the collaborative document on the user interface 500b.

In the illustrative example, the document share window 510 includes a share entry box 512 in which the user may input a virtual space and/or a user account associated with an additional user with which to share the collaborative document 502. In some examples, the document share window 510 can be configured to receive a manual input entry of one or more virtual space identifiers (e.g., names, nicknames, unique identifiers, etc.) and/or one or more user identifiers associated with other users of the communication platform. In some examples, the document share window 510 can have associated therewith a drop-down menu via which the user 504 may select one or more virtual spaces and/or user accounts with which to share the collaborative document 502.

In various examples, the document share window 510 can include a message entry box 514 in which the user 504 can input a message to the receiving user(s) of the newly shared collaborative document 502. That is, in response to receiving an input of a message in association with the message entry box 514, and in response to receiving a request to share the collaborative document (e.g., receiving an indication of selection of a share control 516), the communication platform can cause the message to be presented to the receiving users, such as in association with a feed corresponding to the virtual space via which the collaborative document 502 is shared. In examples in which the collaborative document 502 is shared with another user, the message can be presented via a direct messaging instance between the user 504 and the other user.

In the illustrative example, the document share window 510 includes a previous share indication 518. The previous share indication can provide data associated with one or more virtual spaces or other user accounts with which the collaborative document 502 has previously been shared. As a non-limiting example, the previous share indication 518 can include a virtual space identifier associated with the share, a name of the document, the user account associated with the share (e.g., user who shared the document via the virtual space), a timestamp associated with the share, and a link to the collaborative document.

In some examples, the document share window 510 can include a link copy affordance 520 via which the user can copy a link to the collaborative document 502. In some examples, the document share window 510 may additionally include a save draft affordance 522, that, when selected, can cause the communication platform to store data input via the document share window 510, such as to enable the user 504 to save the input in order to share the collaborative document 502 at a future time. As discussed above, the user 504 may select the share control 516 to share the collaborative document with one or more selected additional users (e.g., directly with another user and/or via a virtual space).

Figure 5C:
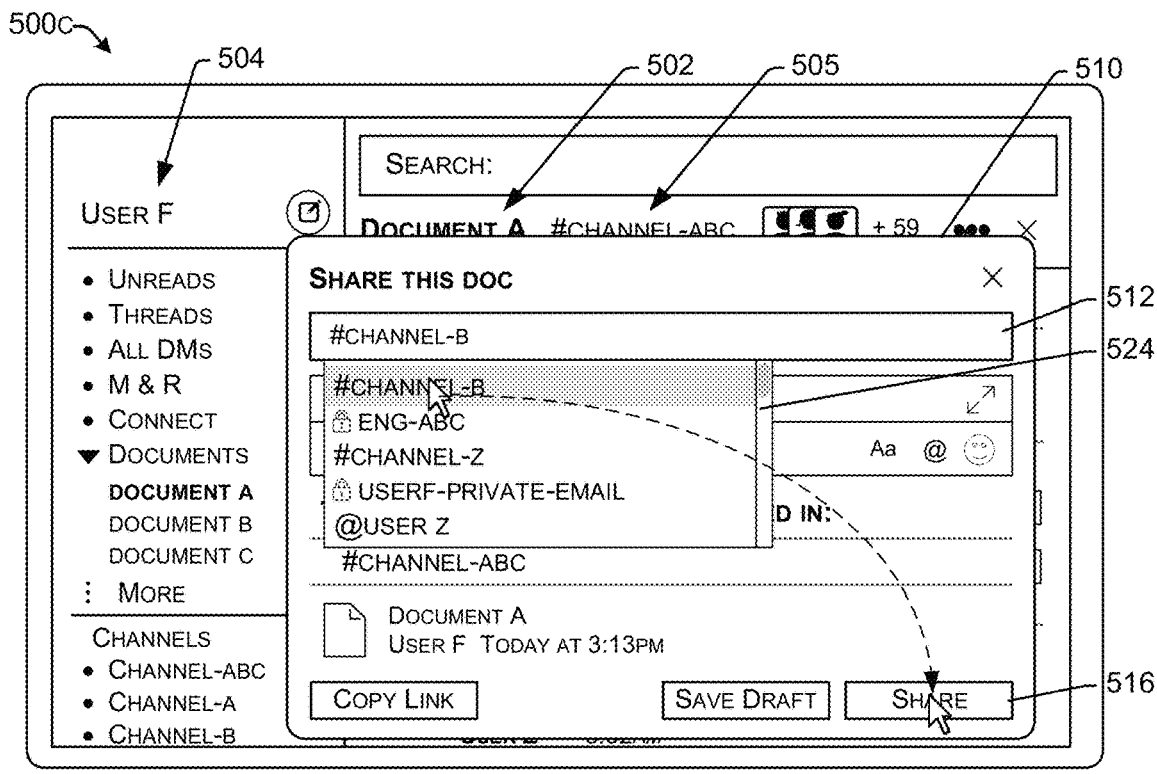

FIG. 5C illustrates an example user interface 500c in which a drop-down menu 524 associated with the document share window 510 is presented. In at least one example, the user 504 can activate the drop-down menu 524 associated with the share entry box 512. In some examples, the drop-down menu 524 can include a list of the virtual spaces with which the user 504 is associated via the communication platform. In some examples, the drop-down menu 524 can additionally include one or more user identifiers associated with user(s) with whom the user 504 is connected via the communication platform.

In some examples, the communication platform can present the virtual spaces and/or the user identifiers in an ordered list. In some examples, the order can be determined based on an alpha-numeric order, based on a frequency and/or recency of interaction with the virtual spaces and/or other users, keywords or common terms shared between the collaborative document 502 and the virtual spaces and/or in messages between users, an indicator as a preferred virtual space, a special relationship with a user associated with a user identifier (e.g., friend, co-worker, partner, family, etc.), and/or other factors that may influence a ranking or ordering of the virtual spaces and/or user identifiers.

In the illustrative example of FIG. 5C, the user 504 selects a second virtual space 526 (e.g., #channel-b) via which to share the collaborative document. In response to receiving the selection of the indicator associated with the second virtual space 526 and a selection of the share control 516, the communication platform can cause the collaborative document 502 to be shared in association with the second virtual space 526. That is, the communication platform can identify one or more members of the second virtual space 526 and can update membership of the collaborative document to include members of the first virtual space 505 and members of the second virtual space 526.

Figure 5D:
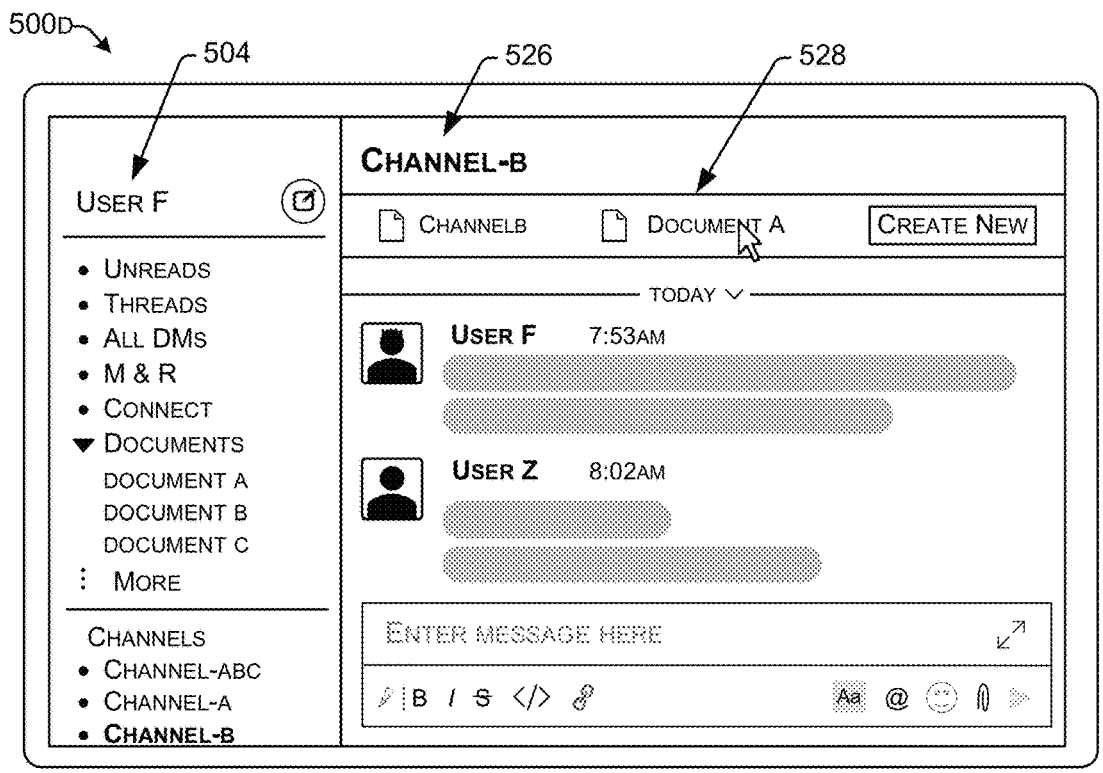

FIG. 5D illustrates an example user interface 500d in which the communication platform causes an affordance 528 associated with the collaborative document 502 to be presented in association with the second virtual space 526, based on the share. Though illustrated in a header associated with the second virtual space 526, this is not intended to be limiting, and the affordance 528 can alternatively be presented at another location associated with the second virtual space 526.

In at least one example, the affordance 528 can include an interface element that, when selected by the user 504, causes the collaborative document 502 to be presented to a viewing user.

Figure 5E:
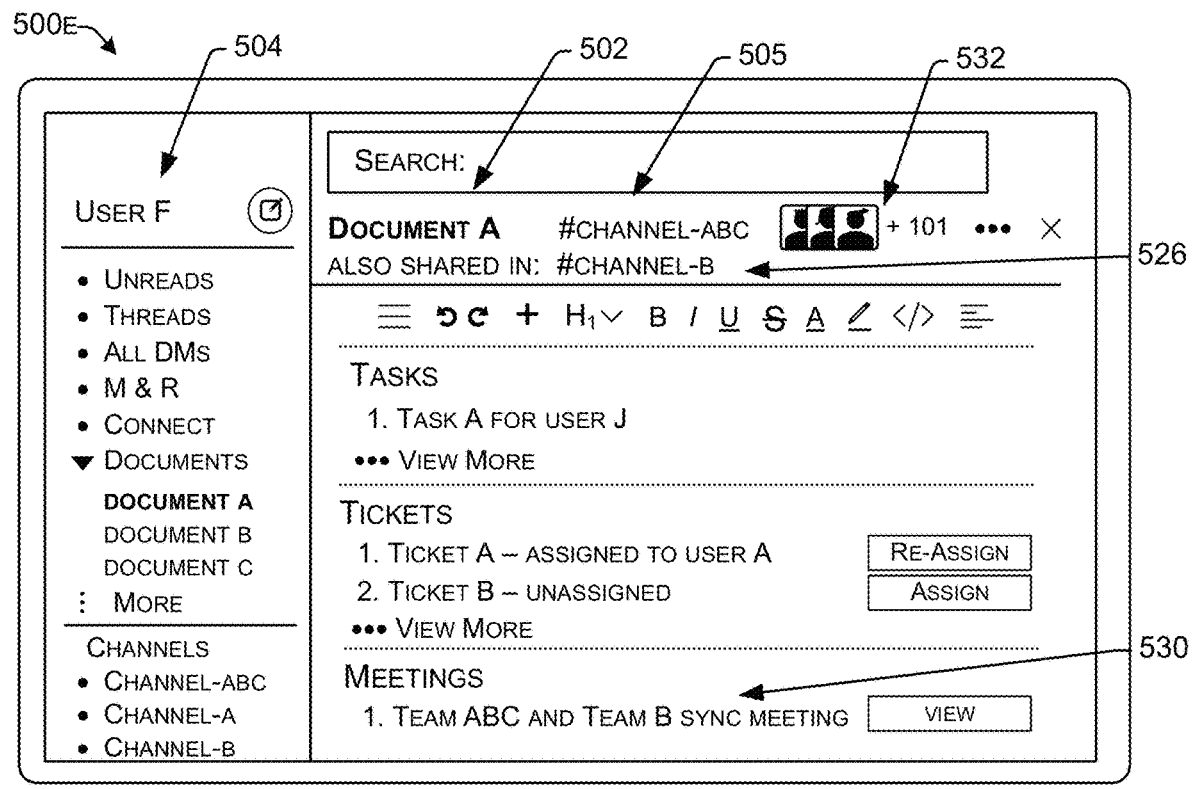

FIG. 5E illustrates an example user interface 500e in which the collaborative document 502 is presented, such as in response to receiving an indication of selection of the affordance 528 associated therewith. In some examples, the affordance 528 can include the affordance that is associated with the second virtual space 526 and/or an affordance associated with the collaborative document that is presented in a sidebar of the user interface 500e.

As discussed above, the collaborative document 502 may have an editable text section, one or more object sections associated with one or more objects, and one or more messaging interfaces, threads, and/or the like. In at least one example, the collaborative document 502 can include object(s) that are associated with the first virtual space 505 and/or users associated therewith and object(s) that are associated with the second virtual space 526 and/or users associated therewith. That is, in response to receiving the request to share the collaborative document 502 via the second virtual space 526, the communication platform can identify object(s) that are associated with the second virtual space 526 and/or users associated therewith. For example, the communication platform can identify an object 530 that includes a sync meeting between members of the first virtual space 505 and the second virtual space 526.

Additionally, in various examples, in response to receiving the request to share the collaborative document 502 via the second virtual space 526, the communication platform can update a presence indicator 532 associated with the collaborative document 502, which may correspond to presence indicator 238, to include the members of the first virtual space 505 and the second virtual space 526. For an illustrative example, the collaborative document 502, before sharing via the second virtual space 526, included 59 members and after sharing via the second virtual space 526, included 101 members.

Figure 6A:
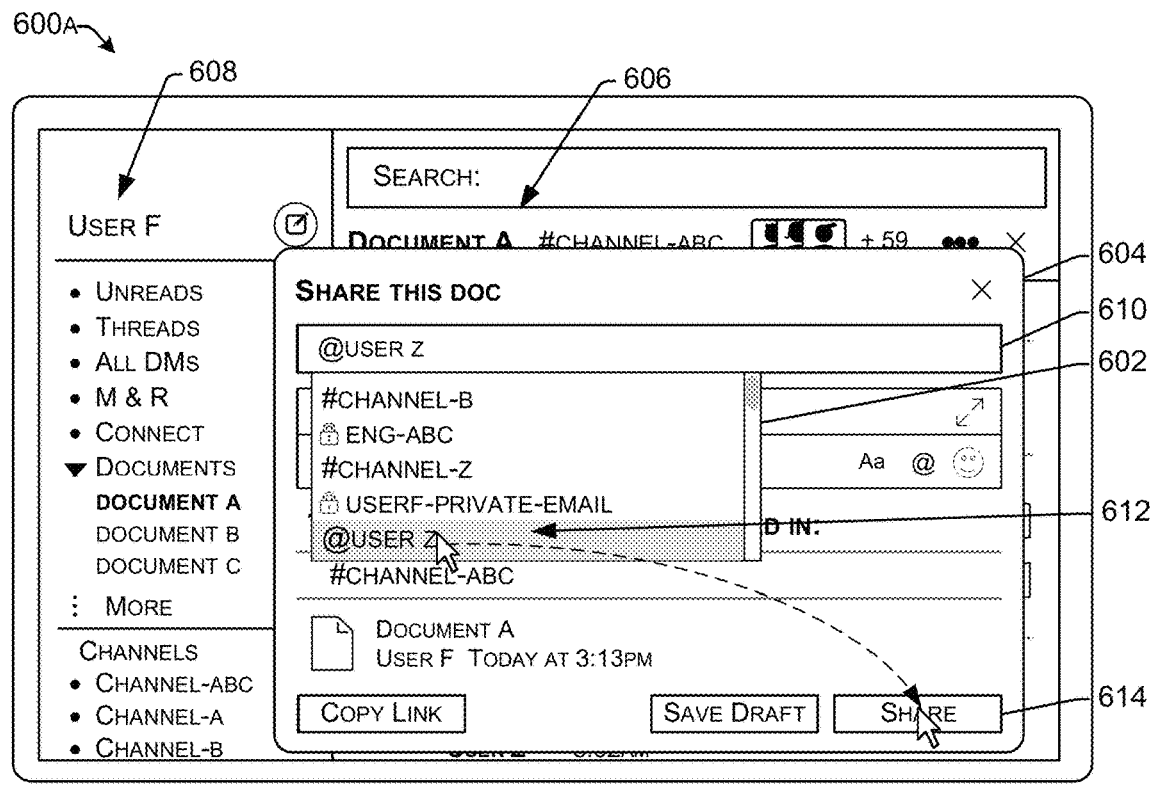
FIGS. 6A and 6B illustrate example user interfaces for sharing a document with another user of a communication platform, as described herein.
Figure 6B:
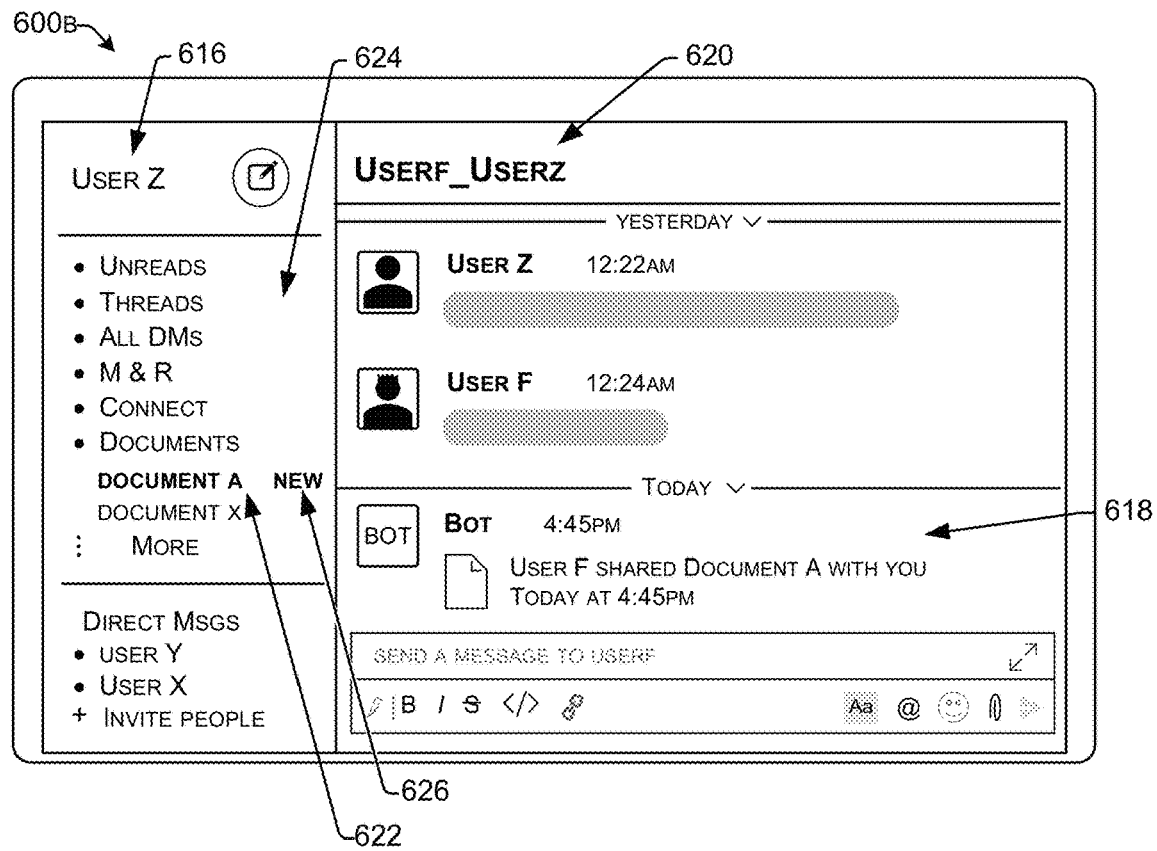

FIGS. 6A and 6B illustrate example user interfaces for sharing a document with another user of a communication platform, as described herein. FIG. 6A illustrates an example user interface 600a in which a drop-down menu 602 associated with a document share window 604 corresponding to a collaborative document 606, which can correspond to drop-down menu 524 associated with the document share window 510, is presented. As discussed above with respect to FIG. 5C, the drop-down menu 602 can be presented in association with a share entry box 610, such as share entry box 512, which can be configured for the user 608 to enter in one or more virtual space identifiers and/or user identifiers associated with a share of a collaborative document 606.

The drop-down menu 602 can include a list of one or more virtual spaces and/or one or more user identifiers associated with users with whom a user 608 is connected via the communication platform. As discussed above, the virtual space(s) and/or the user identifier(s) can be presented in an ordered list, such as based on one or more factors associated with preferences, interactions, relationships, and/or the like. In the illustrative example, the user selects a particular user identifier 612 associated with a user (e.g., User Z) with whom the user 608 wants to share the collaborative document 606. In response to receiving an indication of selection of a share control 614, such as share control 516, the communication platform can share the collaborative document 606 with the selected user associated with the user identifier 612, such as via a direct messaging instance between the user 608 and the selected user.

FIG. 6B illustrates an example user interface 600b associated with a selected user 616 with which a collaborative document was shared by the user 608. That is, the user interface 600b can include a user interface that is associated with a user account of the selected user 616.

In various examples, in response to receiving the request to share the collaborative document 606 (e.g., selection of the share control 614 by the user 608), the communication platform can generate an automated message 618 to present in association with a direct messaging instance 620 between the user 608 and the selected user 616. The automated message 618 may include details about the collaborative document 606 (e.g., a name, a sharing user (e.g., User F), a time associated with a share, a link to the collaborative document 606, and/or the like. As discussed above, in some examples, the user 608 can include a message in the request to share the collaborative document 606 (e.g., via the document share window 604). In such examples, the automated message 618 can include the message from the user 608. In at least one example, the communication platform can cause the message composed by the user 608 to be presented as if it was published in association with a user account associated with the user 608. That is, the communication platform can cause the message via the direct messaging instance 620 as if it was sent directly by the user 608.

In at least one example, the communication platform can cause an affordance 622 associated with the collaborative document 606 to be presented in a sidebar 624 of the user interface 600b. As discussed above, the affordance 622, when selected by the selected user 616, can cause the associated collaborative document 606 to be presented via the user interface 600b. In various examples, the communication platform can additionally include a notification 626 or another alert associated with the affordance 622 to indicate that the collaborative document 606 has been recently associated with the user account of the selected user 616. In the illustrative example, the notification includes an indication that the affordance 622 and/or collaborative document 606 is "new" to the user account. However, this is not intended to be so limiting, and other notifications 626 are contemplated herein, such as bold text, different color text (e.g., red, blue, green, etc.), a symbol (!, *, etc.), or other indicator to alert the user that the collaborative document 606 has been recently associated with the user account.

Figure 7A:
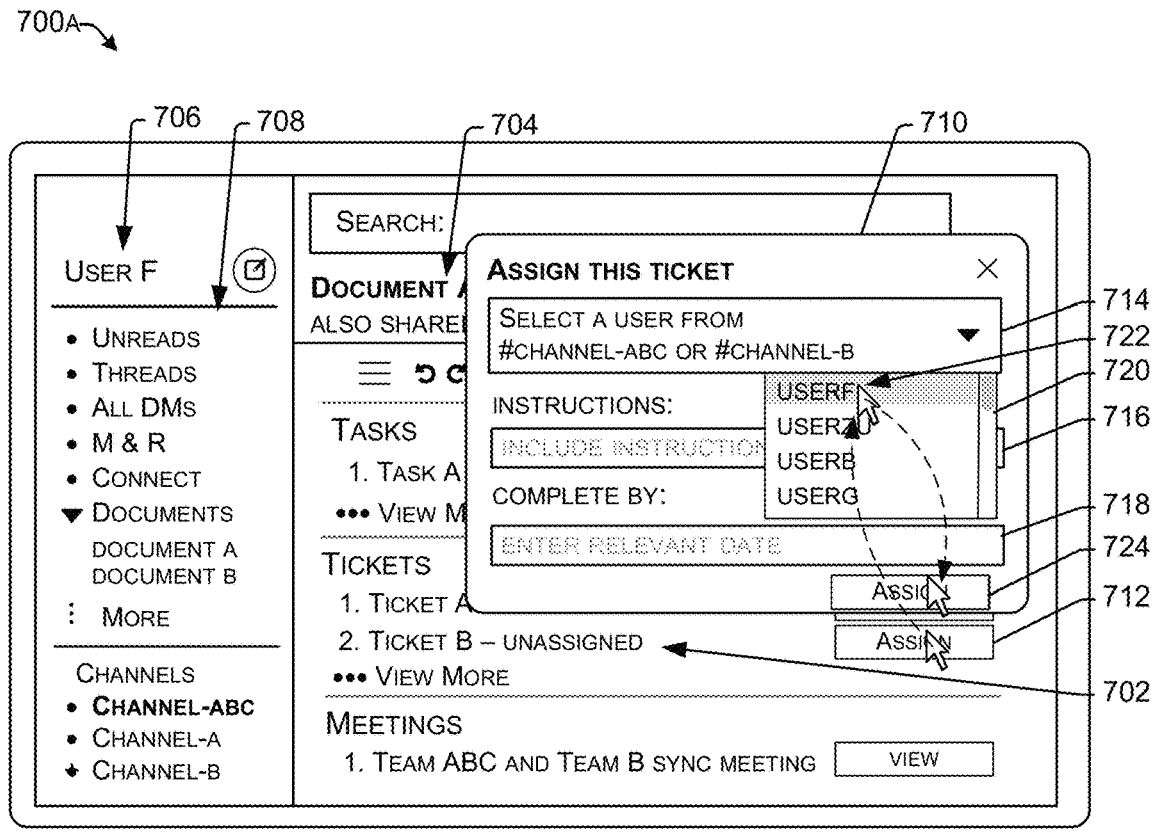
FIGS. 7A-7C illustrate example user interfaces for assigning an object associated with a document to a user account that is associated with the document and presenting an indication of the object in at least a sidebar of a user interface associated with the user account, as described herein.
Figure 7B:
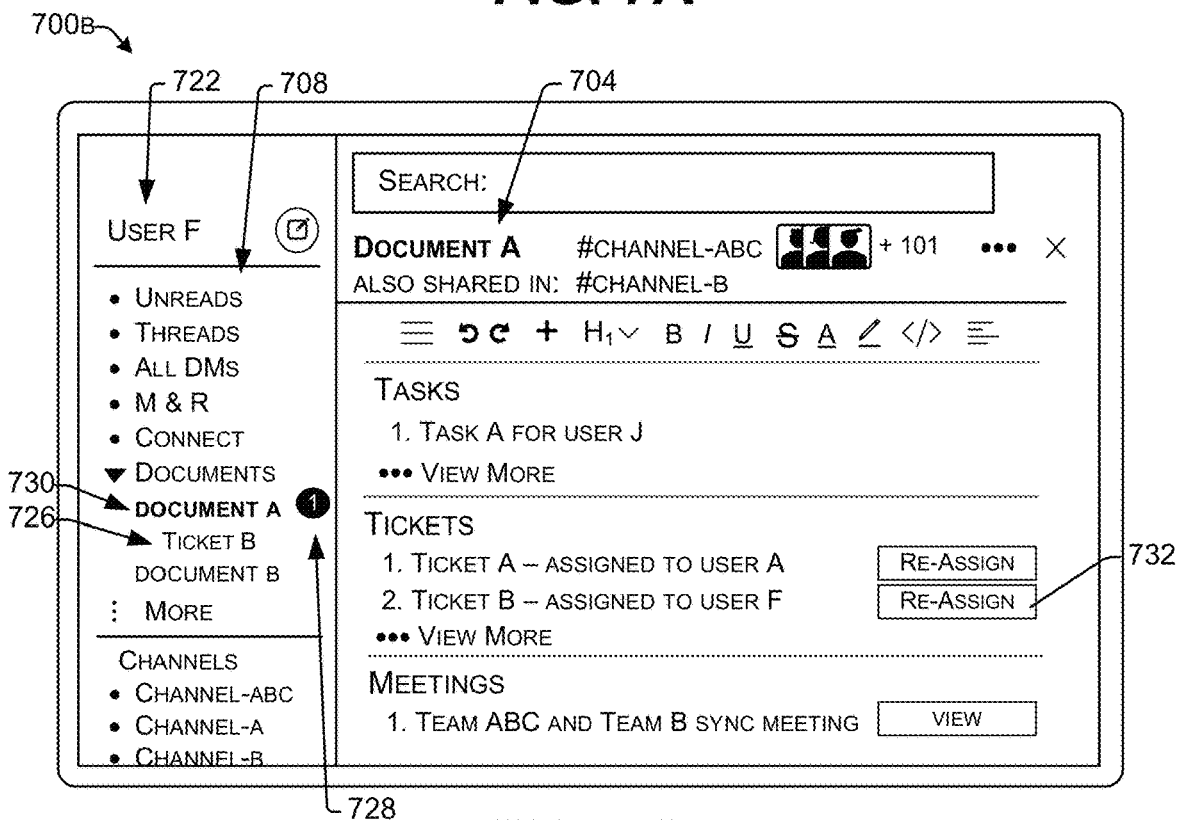
Figure 7C:
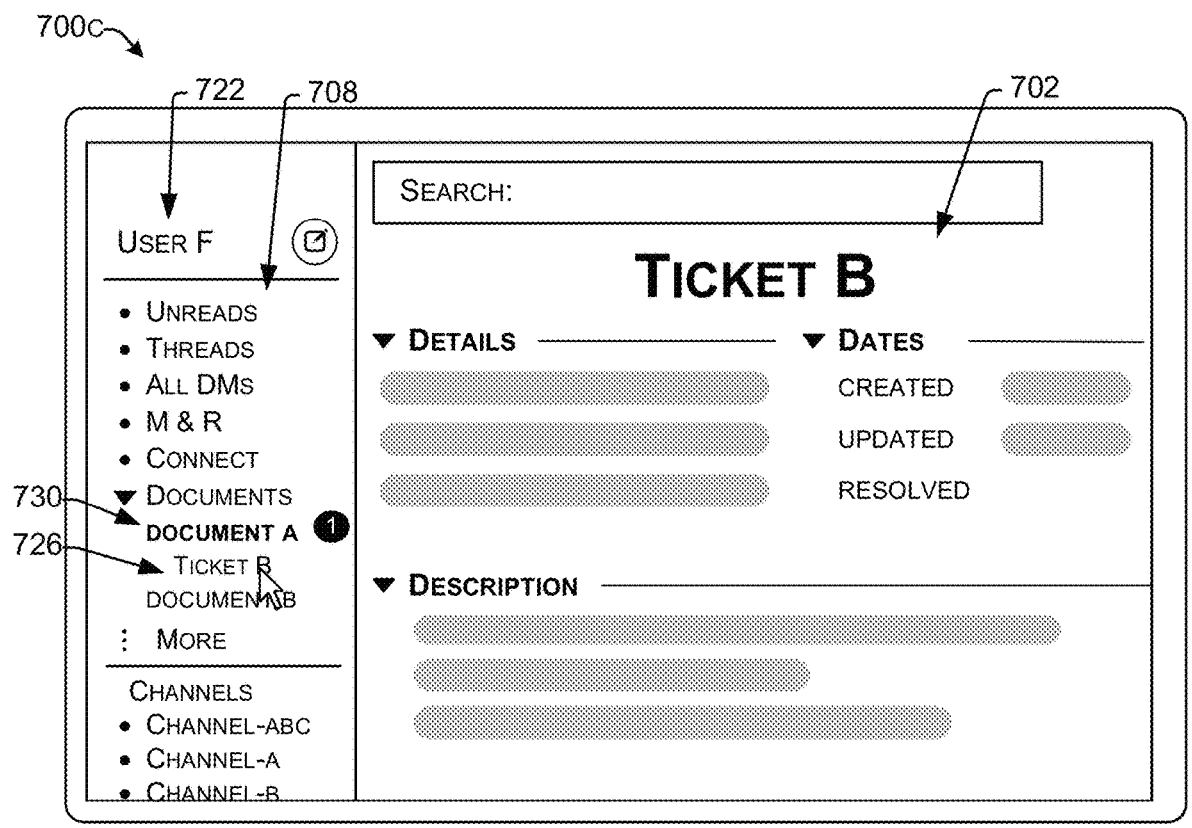

FIGS. 7A-7C illustrate example user interfaces for assigning an object 702 associated with a collaborative document 704 to a user account (of a user 706) that is associated with the collaborative document 704 and presenting an indication of the object 702 in at least a sidebar 708 of a user interface associated with the user account, as described herein. FIG. 7A illustrates an example user interface 700a in which an object assignment window 710 is presented in association with the collaborative document 704. In at least one example, the communication platform can cause the object assignment window 710 to be presented in response to a selection, by the user 706, of an object assignment control 712 associated with the object 702. In various examples, the communication platform can cause a presentation of the object assignment control 712 in association with the user interface 700a based on a determination that the user account associated therewith (e.g., user account of the user 706) includes permissions to assign and/or re-assign one or more objects 702 associated with the collaborative document 704.

In the illustrative example, the object assignment window 710 includes a user selection box 714, an instruction entry box 716, and a date entry box 718. In other examples, the object assignment window 710 may include additional or alternative entry boxes for sharing information about the object 702. In at least one examples, the user selection box 714 can enable the user 706 to enter in one or more user identifiers associated with a user with whom the object 702 is to be assigned. In various examples, the user selection box 714 can include a drop-down menu 720 of one or more user identifiers associated with users associated with the collaborative document 704 that may be selected for assignment. In at least one example the drop-down menu 720 can include a scrollable menu of user identifier(s).

In various examples, the communication platform can identify the user(s) to associate (or include) in the drop-down menu 720 based on membership with the collaborative document, user data associated with the user(s) (e.g., qualifications, education, job type, position, title, etc.), a number of tasks assigned to each user of the collaborative document 704, an object type associated with the object 702, and/or other factors associated with the user(s), the object 702, and/or the collaborative document 704.

In the illustrative example of FIG. 7A, the user 706 assigns the task to themself, such that the user 706 is a selected user 722 for the assignment of the object 702. In other examples, the user 706 can select a different user that is associated with the collaborative document 704 for the assignment of the object.

In various examples, in response to receiving a selection of the assign affordance 724, the communication platform assigns the object 702 to the selected user 722. That is, in response to receiving an indication of selection of the assign affordance 724, the communication platform associates the object with a user account of the selected user 722.

FIG. 7B illustrates an example user interface 700b in which an affordance 726 associated with the object 702 is presented in the sidebar 708, such as based on the assignment of the object.

In various examples, in response to receiving the indication of selection of the assign affordance 724, the communication platform can cause the affordance 726 to be presented in the sidebar of the user interface 700b associated with the selected user 722, which in the illustrative example, is the same as the user 706. Additionally or alternatively, the communication platform can cause a notification 728 to be presented in association with an affordance 730 associated with the collaborative document 704 in the sidebar 708. In at least one example, the notification 728 can provide a means by which the selected user 722 can identify a modification or change associated with the collaborative document 704, such as based on the assignment of the object 702. In the illustrative example, the notification 728 includes bold text and a numerical indicator indicating that a single change has been made with respect to the collaborative document 704. In other examples, the notification 728 can include alternative alerts, such as haptics, sounds, and/or other text, numbers, or symbols to inform the selected user 722 that the collaborative document 704 has been updated.

In various examples, the affordance 726 associated with the object 702 can be configured such that, when selected, the communication platform causes the object 702 to be presented via the user interface 700b. in some example, the object 702 can be presented directly, such that the user interface 700b is modified to include the object 702 and details associated therewith. In some examples, the object 702 can be presented in association with the collaborative document, such as in a pop-up window, overlay, and/or the like. In at least one example, one or more affordances, such as affordance 726 associated with object(s) corresponding to a collaborative document 704 that are assigned to a particular user may be presented in the sidebar 708. That is, different members of the collaborative document 704 may include different affordances associated with different objects in their respective sidebars, based on object assignments. For example, a first sidebar of an interface associated with a first user may include a first affordance associated with a first object that is assigned to the first user and a second sidebar of an interface associated with a second user can include a second affordance associated with a second object that is assigned to the second user. Though described herein as object(s) that are assigned to a user, this is not intended to be so limiting and the sidebar 708 associated with a particular user can include affordances associated with one or more objects that are assigned to or otherwise associated with the particular user. For example, a meeting invitation for a meeting to which the particular user is invited or otherwise associated may be presented in association with the sidebar 708.

Additionally, in at least one example, user interface 700b associated with the collaborative document 704 can include a re-assignment affordance 732 that, when selected by a viewing user (e.g., selected user 722, user 706, etc.), enables an associated object 702 to be re-assigned to an additional or alternative user. In various examples, the re-assignment affordance 732 can be presented in association with a user account that includes associated permissions to assign and/or re-assign objects 702.

FIG. 7C illustrates an example user interface 700c in which the object 702 is presented. In various examples, in response to receiving an indication of selection of the affordance 726 associated with the object 702 in the sidebar 708, the communication platform can cause data associated with the object 702 to be presented. In some examples, the object 702 can be presented in association with the associated collaborative document 704, such as in a location of the collaborative document 704 in which the object is stored and/or presented. In some examples, the object 702 can be presented directly, or independently of the collaborative document 704. In examples in which the object 702 is a third-party object, the communication platform can request data associated with the object 702 from a third-party service provider, such as third party service provider 108, to present the data in association with the user interface 700c. In some examples, in response to receiving the indication of selection of the affordance 726, the communication platform can launch a third-party application or website associated with the object 702, such as to enable the selected user 722 to access the data directly from the third-party service provider.

Figure 8:
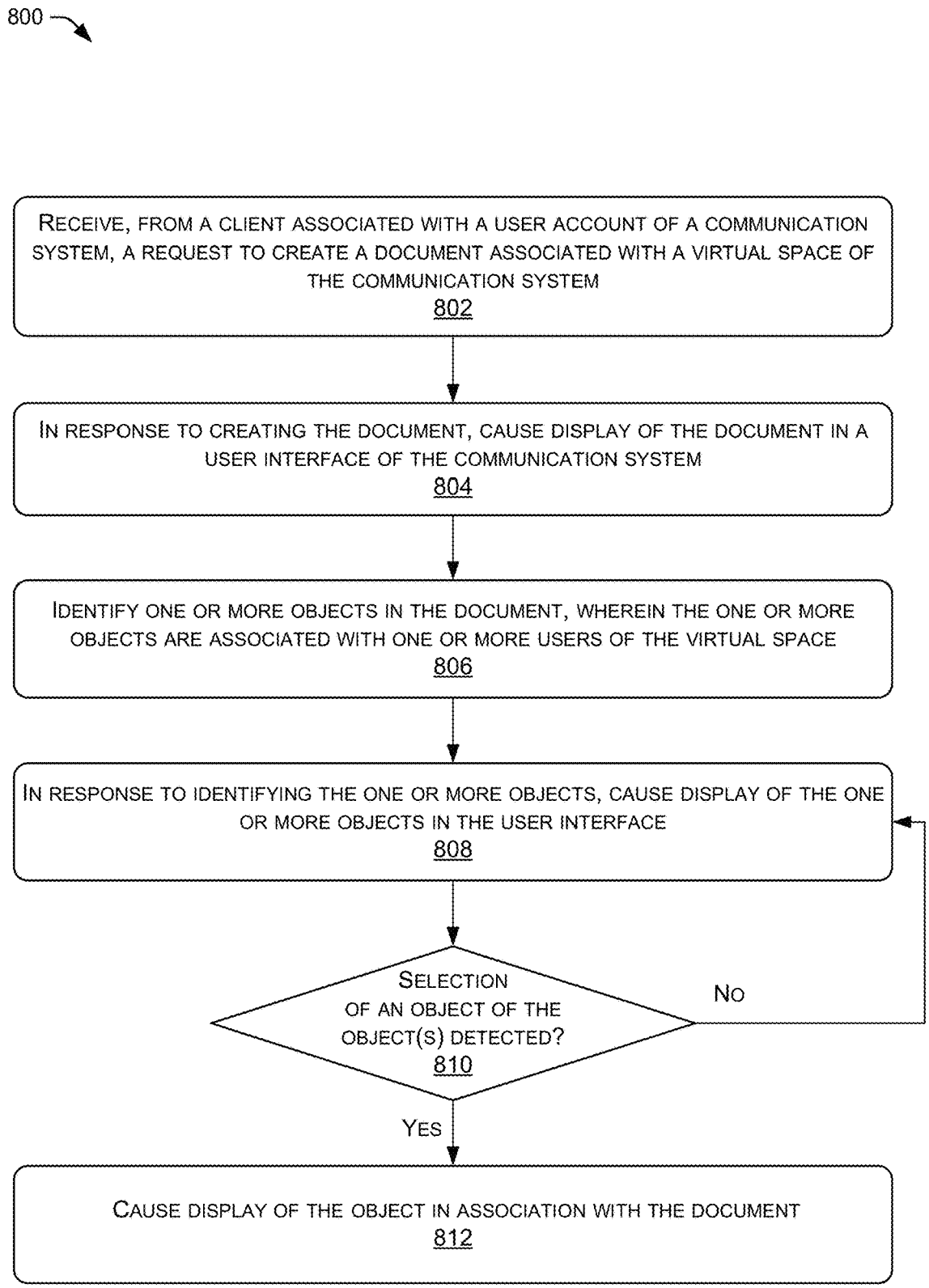
FIG. 8 is an example process for creating a collaborative document in association with a communication platform and presenting an object in association with the collaborative document based on data associated with user accounts that are associated with the collaborative document, as described herein.
Figure 9:
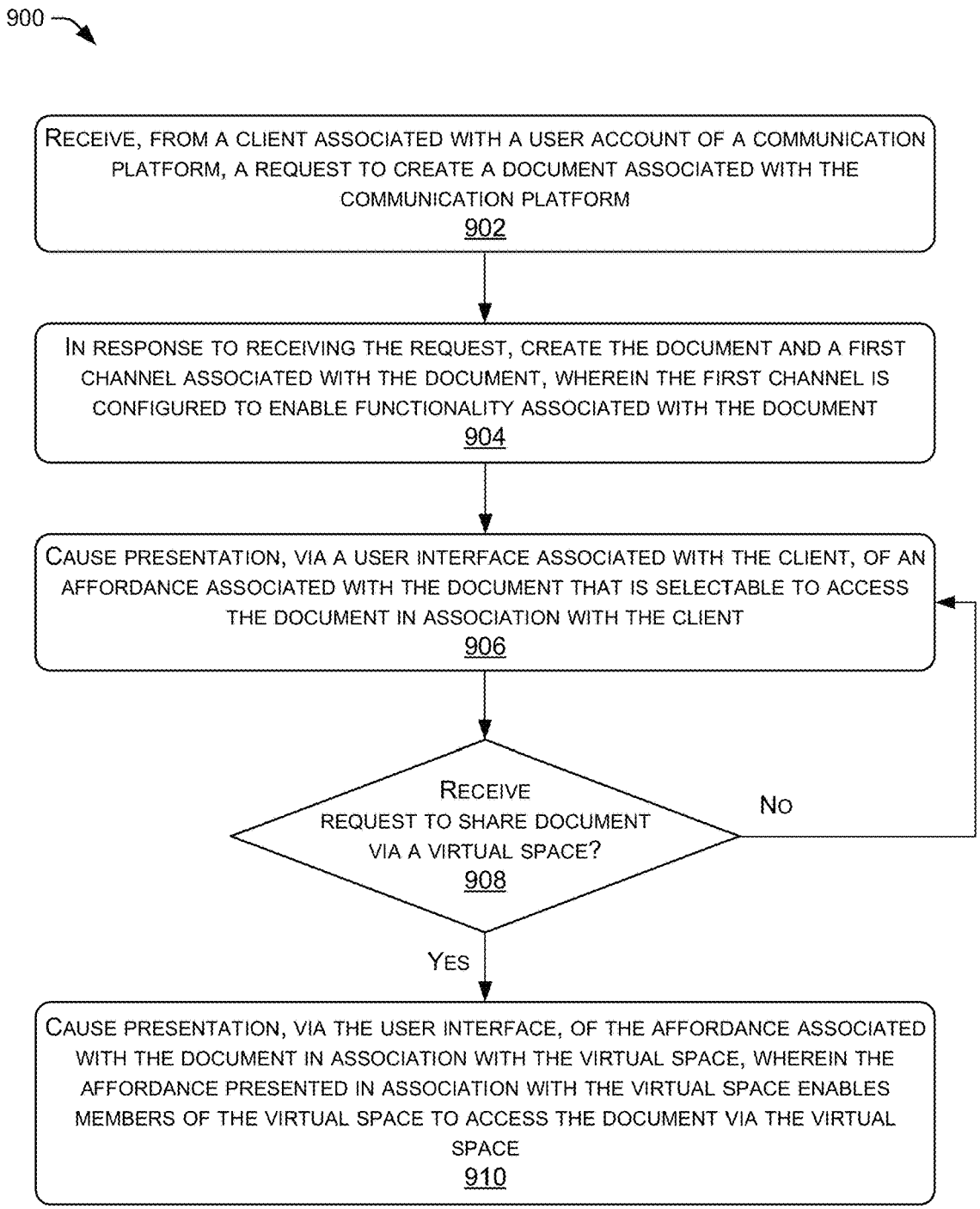
FIG. 9 is an example process for creating a collaborative document in association with a communication platform and sharing the collaborative document via a virtual space of the communication platform, as described herein.

FIGS. 8 and 9 are flowcharts showing example processes involving techniques as described herein. The processes illustrated in FIGS. 8 and 9 are described with reference to components described above with reference to the system 100 shown in FIG. 1 for convenience and ease of understanding. However, the processes illustrated in FIGS. 8 and 9 are not limited to being performed using the components described above with reference to the system 100. Moreover, the components described above with reference to the system 100 are not limited to performing the processes illustrated in FIGS. 8 and 9.

FIG. 8 illustrates an example process 800 for creating a collaborative document in association with a communication platform and presenting an object in association with the collaborative document based on data associated with user accounts that are associated with the collaborative document, as described herein.

At operation 802, a server 102 receives, from a client associated with a user account of a communication system, a request to create a document associated with a virtual space of the communication system. In at least one example, the document can include a collaborative document, as described herein. That is, the document can include a virtual space including editable text and one or more objects that can be manipulated or otherwise interacted with by one or more users associated with the document.

In various examples, the virtual space can include, but is not limited to a workspace, a communication channel, a direct message instance, audio or video communication, and/or the like. For example, a user associated with the user account may select an affordance associated with creating a new document that is presented in association with a communication channel, such as new document affordance 314. In some examples, the request to create the document can be received independent of a virtual space. That is, the user can submit a first request to create the document independent of a virtual space (e.g., in association with a user account of the first user), such that the collaborative document can be available for use by the first user.

In various examples, in response to receiving the request, the server 102 can identify one or more user accounts that are to be associated with the document. That is, the server 102 can identify members of the document. In some examples, the user account(s) can include the user account(s) that are associated with the virtual space associated with the request to create the document. In such examples, members of the virtual space may be members of the document. In some examples, the server 102 can identify members based on input associated with the request. For example, the request to create the document can include an indication of intent to share the document with one or more other users. Based on the indication of intent, the server 102 can identify the other user(s) as members of the document, as well as the requesting user and/or members of the virtual space.

At operation 804, in response to creating the document, the server 102 causes display of the document in a user interface of the communication system. In various examples, the server 102 can associate a channel identifier with the document, such as in metadata associated with the document. In some examples, based on the channel identifier association, the document can be treated as, and include the functionalities associated with, a communication channel. The communication channel can be a data route used for exchanging data between and among systems and devices associated with the communication platform. In at least one example, the server 102 can establish a communication route between and among various clients associated with members of the document, allowing the clients to communicate, share data, and modify data shared between and among each other.

At operation 806, the server 102 identifies one or more objects in the document, wherein the one or more objects are associated with one or more users of the virtual space. An object can include, but is not limited to, text, audio and/or video files, a task, a ticket to be resolved, an event (e.g., scheduled event, calendar invitation, calendar instance, etc.), a message previously transmitted via the communication platform, an image, a graphic, a link to a local object, a link to a remote object (e.g., third-party object), a file, and/or the like.

In various examples, the server 102 identifies the object(s) based on the user accounts associated with the document. That is, the server 102 can identify the object(s) based on membership of the document, identifying objects that are associated with members thereof. In some examples, the server 102 can identify object(s) based on an association with the virtual space via which the document was created. In some examples, and as described above, the server 102 can identify the object(s) based on a topic, keywords, description, and/or the like associated with the document. For example, a name of the document can include "Project A". The server 102 can identify object(s) associated with Project A and can associate those objects with the document.

At operation 808, in response to identifying the one or more objects, the server 102 causes display of the one or more objects in the user interface. In various examples, the server 102 causes display of the object(s) in association with the document. In some examples, the server 102 can be configured to identify one or more users associated with each object, and can include affordances associated therewith in sidebars of user interfaces associated with the user(s). In such examples, the server 102 can present an affordance associated with an object in a sidebar of a user interface corresponding to a user who is assigned to or otherwise associated with the object. That is, a sidebar associated with a user interface of a member of the document can include a personalized object list that is associated with the member, such as to facilitate awareness of and access to objects assigned to the member. In various examples, different members of a document may include different object affordances in respective sidebars, based on object assignments.

At operation 810, the server 102 determines whether a selection of an object of the one or more objects is detected. The selection of the object can include a selection of an indicator associated with the object presented in the document and/or a selection of an affordance associated therewith in a sidebar of a user interface.

Based on a determination that the selection of the object is not detected ("No" at operation 810), the server(s) 102 continues to cause display of the one or more objects in the user interface, as described with regard to operation 810.

Based on a determination that the selection of the object is detected ("Yes" at operation 810), the server 102, at operation 812, causes display of the object in association with the document. In various examples, the object can be displayed at a location in the document. That is, the server 102, in response to receiving the selection of the object or affordance associated therewith, can navigate to the object as it is presented in the document. In some examples, in response to receiving the selection of the object, the server 102 can cause data associated with the object to be presented in the user interface, such as in a pop-up window, overlay, and/or the like. In various examples, the server 102 can cause data associated with the object to be presented via the user interface in lieu of the document. In such examples, the data associated with the object can replace the document in the user interface.

In at least one example, in response to receiving an indication of selection of an object affordance in a sidebar, the server 102 can cause the object data to be presented directly via the user interface. As discussed above, in some examples, objects can include third-party objects, such as those managed by and/or stored in association with a third-party service provider. In such examples, in response to receiving the indication of selection of the object affordance, the server 102 can cause third-party object data to be presented via the client. In some examples, the third-party object data can be presented in association with the communication platform, such as via the user interface. In such examples, the server 102 can request the third-party object data from a third-party computing device via an API call or other request for data. In some examples, in response to receiving the indication of selection of the object affordance, the server 102 can cause the third-party object data to be presented via the client in association with a third-party application or website.

FIG. 9 illustrates an example process 900 for creating a collaborative document in association with a communication platform and sharing the collaborative document via a virtual space of the communication platform, as described herein.

At operation 902, a server 102 receives, from a client associated with a user account of a communication platform (e.g., communication system), a request to create a document associated with the communication system. In at least one example, the document can include a collaborative document, as described herein. That is, the document can include a virtual space including editable text and one or more objects that can be manipulated or otherwise interacted with by one or more users associated with the document.

In various examples, the request can be received via a virtual space. The virtual space can include, but is not limited to a workspace, a communication channel, a direct message instance, audio or video communication, and/or the like. For example, a user associated with the user account may select an affordance associated with creating a new document that is presented in association with a communication channel, such as new document affordance 314. In some examples, the request to create the document can be received independent of a virtual space. That is, the user can submit a first request to create the document independent of a virtual space (e.g., in association with a user account of the first user), such that the collaborative document can be available for use by the first user.

In various examples, in response to receiving the request, the server 102 can identify one or more user accounts that are to be associated with the document. That is, the server 102 can identify members of the document. In some examples, the user account(s) can include the user account(s) that are associated with the virtual space associated with the request to create the document. In such examples, members of the virtual space may be members of the document. In some examples, the server 102 can identify members based on input associated with the request. For example, the request to create the document can include an indication of intent to share the document with one or more other users. Based on the indication of intent, the server 102 can identify the other user(s) as members of the document, as well as the requesting user and/or members of the virtual space.

At operation 904, in response to receiving the request, the server 102 creates the document and a first channel associated with the document, wherein the first channel is configured to enable one or more functionalities associated with the document. In various examples, the first channel can include a communication channel identifier that is associated with the document. The communication channel identifier can include a unique identifier that is associated with the document and that enables communication channel functionalities within the document. The functionalities can include, but are not limited to messaging functionalities (e.g., chat channel), message timing documentation (e.g., time stamps), audio and/or video communications, file uploads, notifications (e.g., associated with modifications to the collaborative document, new messages posted, mentions or tags, etc.), mentioning or tagging functionalities, event conveyance, workflow management and tracking, access permissions, and/or other functionalities that are associated with communication channels. In at least one example, the first channel can enable the document to leverage existing paradigms within the communication platform to enhance functionality of the document with limited overhead.

At operation 906, the server 102 causes presentation, via a user interface associated with the client, of an affordance associated with the document that is selectable to access the document in association with the client. In some examples, the affordance can be associated with a documents interface, such as documents interface 154. In such examples, the documents interface can include an interface for organization and management of one or more documents that are associated with the user account. In various examples, the affordance can be associated with a sidebar of the user interface. That is, the affordance can be a persistent affordance that is available for selection by the user, regardless of the data with which the user interacts via the user interface.

At operation 908, the server 102 determines whether a request to share the document via a virtual space of the communication platform is received. In various examples, the document can have associated therewith a share option that, when selected by the user, enables the user to initiate a document share with one or more other users of the communication platform. In some examples, the share option can be presented to the user based on a determination that the user account includes sharing permissions. That is, the communication platform can determine whether the user account is authorized to share the document, and based on a determination that sharing is authorized with respect to the user account, the communication platform can cause display of the sharing option in association with the document.

In at least one example, the request to share the document can include one or more virtual space identifiers and/or user identifiers associated with the share. The virtual space identifier(s) and user identifier(s) can represent the virtual space via which and/or particular users with whom the requesting user intends to share the document. As described above with regard to FIGS. 5B and 5C, the server 102 can provide a list of one or more virtual spaces that are eligible for document sharing and/or user identifiers associated with users with whom the requesting user is connected via the communication platform. As discussed above, the list of virtual space(s) and/or user identifier(s) can be ordered based various factors, such as interaction data, preference data, relationship data, and/or the like.

Based on a determination that the request to share the document via the virtual space is not received ("No" at operation 908), the server 102 continues to cause presentation of the affordance associated with the document via a user interface, as described with respect to operation 906.

Based on a determination that the request to share the document via the virtual space is received ("Yes" at operation 908), the server 102, at operation 910, causes presentation, via the user interface, of the affordance associated with the document in association with the virtual space, wherein the affordance presented in association with the virtual space enables members of the virtual space to access the document via the virtual space. In various examples, the server 102 can modify membership of the document based on the share. That is, the server 102 can identify additional users with whom the document is shared (e.g., members of a second virtual space associated with the document sharing process, individual users selected in the document sharing process, etc.), and can associate the additional members as members of the document.

In various examples, the server 102 can identify one or more object(s) associated with the additional members to be included in the document. In such examples, the server 102 can identify object(s) that are associated with the document and the additional members, and can cause a presentation thereof on the document. That is, the server 102 can be configured to update object(s) included in the document based on the updated membership (e.g., new members). Additionally, as described above, the server 102 can be configured to update a presence indicator, such as presence indicator 238, based on the updated membership. Accordingly, the server 102 can continually update and render updated data associated with the document to members thereof (e.g., via respective clients), such as to enhance capabilities of collaboration enabled by the document.

As such, techniques described herein provide specific, technical solutions to technical problems faced by existing systems, the details of which are described above.

EXAMPLE CLAUSES

A. A method, implemented at least in part by one or more computing devices of a communication platform, the method comprising: receiving a first request to create a document associated with a virtual space of a communication system and a first user account of a first user; in response to creating the document, causing display of the document in a first user interface of the communication system; identifying one or more objects in the document, wherein the one or more objects are associated with one or more users of the virtual space; in response to identifying the one or more objects, causing display of the one or more objects in the first user interface; detecting a selection of an object of the one or more objects in the first user interface; and in response to detecting the selection of the object, causing display of the object in the document.

B. The method of paragraph A, further comprising: in response to creating the document, causing display of an indicator associated with the document in a sidebar associated with the first user interface, wherein the sidebar comprises the indicator associated with document and one or more communication channels of the communication system that are associated with the first user of the one or more users.

C. The method of paragraph A or B, further comprising: receiving a second request to associate the document with a second user account of a second user that is different from the one or more users; in response to receiving the second request, associating the document with the second user account; and in response to associating the document with the second user account, causing display of an identifier associated with the document in a sidebar of a second user interface associated with the second user account.

D. The method of any of paragraphs A-C, further comprising: receiving a second request to assign the object to a third user of the one or more users; and associating the object with a third user account of the third user.

E. The method of paragraph D, wherein the object is a first object, the method further comprising: based at least in part on an association between the first object and the first user account, causing display of a first identifier associated with the first object in a first sidebar associated with the first user account, wherein the first identifier associated with the first object displayed in the first sidebar is different from a second identifier associated with a second object that is displayed in a second sidebar associated with a second user account that is associated with a different user of the one or more users.

F. The method of paragraph E, wherein the selection of the object is a first selection, the method further comprising: detecting, in association with the first sidebar, a second selection of the first identifier associated with the first object; and in response to detecting the second selection, causing display of the first object via a second user interface, wherein the first object is displayed independently of the document.

G. The method of any of paragraphs A-F, wherein the object comprises at least one of: a task; a ticket; a document; a calendar event; or a message transmitted via the communication system and shared in association with the document.

H. The method of any of paragraphs A-G, wherein the virtual space comprises a communication channel.

I. A system comprising: one or more processors; and one or more non-transitory computer-readable media storing instructions that, when executed, cause the system to: receive a first request to create a document associated with a virtual space of a communication system and a first user account of a first user; in response to creating the document, cause display of the document in a first user interface of the communication system; identify one or more objects in the document, wherein the one or more objects are associated with one or more users of the virtual space; in response to identifying the one or more objects, cause display of the one or more objects in the first user interface; detect a selection of an object of the one or more objects in the first user interface; and in response to detecting the selection of the object, cause display of the object in the document.

J. The system of paragraph I, wherein the instructions further cause the system to: in response to creating the document, cause display of an indicator associated with the document in a sidebar associated with the first user interface, wherein the sidebar comprises the indicator associated with document and one or more communication channels of the communication system that are associated with the first user of the one or more users.

K. The system of paragraph I or J, wherein the instructions further cause the system to: receive a second request to associate the document with a second user account of a second user that is different from the one or more users; in response to receiving the second request, associate the document with the second user account; and in response to associating the document with the second user account, cause display of an identifier associated with the document in a sidebar of a second user interface associated with the second user account.

L. The system of any of paragraphs I-K, wherein the instructions further cause the system to: receive a second request to assign the object to a third user of the one or more users; and associate the object with a third user account of the third user.

M. The system of paragraph L, wherein the object is a first object and wherein the instructions further cause the system to: based at least in part on an association between the first object and the first user account, cause display of a first identifier associated with the first object in a first sidebar associated with the first user account, wherein the first identifier associated with the first object displayed in the first sidebar is different from a second identifier associated with a second object that is displayed in a second sidebar associated with a second user account that is associated with a different user of the one or more users.

N. The system of paragraph M, wherein the selection of the object is a first selection and wherein the instructions further cause the system to: detect, in association with the first sidebar, a second selection of the first identifier associated with the first object; and in response to detecting the second selection, cause display of the first object via a second user interface, wherein the first object is displayed independently of the document.

O. The system of any of paragraphs I-N, wherein the object comprises at least one of: a task; a ticket; a document; a calendar event; or a message transmitted via the communication system and shared in association with the document.

P. The system of any of paragraphs I-O, wherein the virtual space comprises a communication channel.

Q. One or more non-transitory computer-readable media storing instructions that, when executed, cause one or more processors to: receive a first request to create a document associated with a virtual space of a communication system and a first user account of a first user; in response to creating the document, cause display of the document in a first user interface of the communication system; identify one or more objects in the document, wherein the one or more objects are associated with one or more users of the virtual space; in response to identifying the one or more objects, cause display of the one or more objects in the first user interface; detect a selection of an object of the one or more objects in the first user interface; and in response to detecting the selection of the object, cause display of the object in the document.

R. The one or more non-transitory computer-readable media of paragraph Q, wherein the instructions further cause the one or more processors to: in response to creating the document, cause display of an indicator associated with the document in a sidebar associated with the first user interface, wherein the sidebar comprises the indicator associated with document and one or more communication channels of the communication system that are associated with the first user of the one or more users.

S. The one or more non-transitory computer-readable media of paragraph Q or R, wherein the instructions further cause the one or more processors to: receive a second request to associate the document with a second user account of a second user that is different from the one or more users; in response to receiving the second request, associate the document with the second user account; and in response to associating the document with the second user account, cause display of an identifier associated with the document in a sidebar of a second user interface associated with the second user account.

T. The one or more non-transitory computer-readable media of any of paragraphs Q-S, wherein the instructions further cause the one or more processors to: receive a second request to assign the object to a third user of the one or more users; and associate the object with a third user account of the third user.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, the method comprising:
   receiving, from a first user account of a first user, a request to create a document;
   determining, based at least in part on the request, that the document is to be associated with a first virtual space of a communication system;
   generating, based at least in part on the request, the document, the document associated with a presence indicator indicating a number of members associated with the document;
   causing, in response to generating the document, display of the document in a first user interface of the communication system;
   determining one or more objects in the document, wherein the one or more objects are associated with one or more users of the first virtual space;
   causing, in response to displaying the document and determining the one or more objects, display of the one or more objects in the first user interface and within the document;
   detecting a selection of an object of the one or more objects being displayed in the document of the first user interface;
   causing, in response to detecting the selection of the object, display of the object in a second user interface;
   receiving a request to share the document to a second virtual space different than the first virtual space;
   causing the document to be shared in association with the second virtual space; and
   updating the presence indicator indicating the number of members associated with the document to additionally include one or more members associated with the second virtual space.

2. The method of claim 1, wherein the request is a first request, further comprising:
   receiving a second request, wherein the second request is to associate the document with a second user account of a second user that is different from the one or more users;
   in response to receiving the second request, associating the document with the second user account; and
   in response to associating the document with the second user account, causing display of an identifier associated with the document in a sidebar of a third user interface associated with the second user account.

3. The method of claim 1, wherein the request is a first request, further comprising:
   receiving a second request, wherein the second request is to assign the object to a second user of the one or more users; and
   associating the object with a second user account of the second user.

4. The method of claim 3, wherein the object is a first object, the method further comprising:
   based at least in part on an association between the first object and the first user account, causing display of a first identifier associated with the first object in a first sidebar associated with the first user account,
   wherein the first identifier associated with the first object displayed in the first sidebar is different from a second identifier associated with a second object that is displayed in a second sidebar associated with a third user account that is associated with a different user of the one or more users.

5. The method of claim 4, wherein the selection of the object is a first selection, the method further comprising:
   detecting, in association with the first sidebar, a second selection of the first identifier, wherein the first identifier is associated with the first object; and
   in response to detecting the second selection, causing display of the first object via a third user interface, wherein the first object is displayed independently of the document.

6. The method of claim 1, wherein the object comprises at least one of:
   a task;
   a ticket;
   a second document;
   a calendar event; or
   a message transmitted via the communication system and shared in association with the document.

7. The method of claim 1, wherein the first virtual space comprises a communication channel.

8. The method of claim 1, wherein the document is associated with a previous share indicator that provides data associated with one or more virtual spaces or other uses accounts with which the document has previously been shared.

9. The method of claim 1, further comprising:
   determining one or more access permissions associated with the first virtual space; and
   causing, in response to generating the document, the one or more access permissions to be associated with the document.

10. The method of claim 1, wherein the request is a first request, the method further comprising:
    receiving, from the first user account of the first user, a second request to share the document; and
    generating, via the communication platform, an automated message to present to a second user account of a second user, the automated message including information about the document.

11. A system comprising:
    one or more processors; and
    one or more non-transitory computer-readable media storing instructions that, when executed, cause the system to:
       receive, from a first user account of a first user, a request to create a document, the document associated with a presence indicator indicating a number of members associated with the document;
       determine, based at least in part on the request, that the document is to be associated with a first virtual space of a communication system;
       generate, based at least in part on the request, the document;
       cause, in response to generating the document, display of the document in a first user interface of the communication system;
       determine one or more objects in the document, wherein the one or more objects are associated with one or more users of the first virtual space;

cause, in response to displaying the document and determining the one or more objects, display of the one or more objects in the first user interface and within the document;

detect a selection of an object of the one or more objects being displayed in the document of the first user interface;

cause, in response to detecting the selection of the object, display of the object in a second user interface;

receive a request to share the document to a second virtual space different than the first virtual space;

cause the document to be shared in association with the second virtual space; and update the presence indicator indicating the number of members associated with the document to additionally include one or more members associated with the second virtual space.

12. The system of claim 11, wherein the request is a first request, wherein the instructions further cause the system to:
receive a second request, wherein the second request is to associate the document with a second user account of a second user that is different from the one or more users;
in response to receiving the second request, associate the document with the second user account; and
in response to associating the document with the second user account, cause display of an identifier associated with the document in a sidebar of a third user interface associated with the second user account.

13. The system of claim 11, wherein the request is a first request, wherein the instructions further cause the system to:
receive a second request, wherein the second request is to assign the object to a second user of the one or more users; and
associate the object with a second user account of the second user.

14. The system of claim 13, wherein the object is a first object and wherein the instructions further cause the system to:
based at least in part on an association between the first object and the first user account, cause display of a first identifier associated with the first object in a first sidebar associated with the first user account,
wherein the first identifier associated with the first object displayed in the first sidebar is different from a second identifier associated with a second object that is displayed in a second sidebar associated with a third user account that is associated with a different user of the one or more users.

15. The system of claim 14, wherein the selection of the object is a first selection and wherein the instructions further cause the system to:
detect, in association with the first sidebar, a second selection of the first identifier, wherein the first identifier is associated with the first object; and
in response to detecting the second selection, cause display of the first object via a third user interface, wherein the first object is displayed independently of the document.

16. The system of claim 11, wherein the object comprises at least one of:
a task;
a ticket;
a second document;
a calendar event; or
a message transmitted via the communication system and shared in association with the document.

17. The system of claim 11, wherein the first virtual space comprises a communication channel.

18. One or more non-transitory computer-readable media storing instructions that, when executed, cause one or more processors to:
receive, from a first user account of a first user, a request to create a document;
determine, based at least in part on the request, that the document is to be associated with a first virtual space of a communication system;
generate, based at least in part on the request, the document, the document associated with a presence indicator indicating a number of members associated with the document;
cause, in response to generating the document,
display of the document in a first user interface of the communication system;
determine one or more objects in the document, wherein the one or more objects are associated with one or more users of the first virtual space;
cause, in response to displaying the document and determining the one or more objects, display of the one or more objects in the first user interface and within the document;
detect a selection of an object of the one or more objects being displayed in the document of the first user interface;
cause, in response to detecting the selection of the object, display of the object in a second user interface;
receive a request to share the document to a second virtual space different than the first virtual space;
cause the document to be shared in association with the second virtual space; and
update the presence indicator indicating the number of members associated with the document to additionally include one or more members associated with the second virtual space.

19. The one or more non-transitory computer-readable media of claim 17, wherein the request is a first request, wherein the instructions further cause the one or more processors to:
receive a second request, wherein the second request is to associate the document with a second user account of a second user that is different from the one or more users;
in response to receiving the second request, associate the document with the second user account; and
in response to associating the document with the second user account, cause display of an identifier associated with the document in a sidebar of a third user interface associated with the second user account.

20. The one or more non-transitory computer-readable media of claim 17, wherein the request is a first request, wherein the instructions further cause the one or more processors to:
receive a second request, wherein the second request is to assign the object to a second user of the one or more users; and
associate the object with a second user account of the second user.

* * * * *